(12) United States Patent
Schwartz et al.

(10) Patent No.: US 11,128,343 B2
(45) Date of Patent: Sep. 21, 2021

(54) SYSTEM FOR GENERATING, TRANSMITTING AND RECEIVING AUXILIARY SIGNALS AND METHODS USEFUL IN CONJUNCTION THEREWITH

(71) Applicant: ELTA SYSTEMS LTD., Ashdod (IL)

(72) Inventors: Adi Schwartz, Holon (IL); Yaakov Shoshan, Ashkelon (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 15/735,002

(22) PCT Filed: Jun. 9, 2016

(86) PCT No.: PCT/IL2016/050604
§ 371 (c)(1),
(2) Date: Dec. 8, 2017

(87) PCT Pub. No.: WO2016/199144
PCT Pub. Date: Dec. 15, 2016

(65) Prior Publication Data
US 2018/0167103 A1 Jun. 14, 2018

(30) Foreign Application Priority Data

Jun. 10, 2015 (IL) .......................................... 239333

(51) Int. Cl.
*H04B 1/74* (2006.01)
*H04B 7/026* (2017.01)
(Continued)

(52) U.S. Cl.
CPC .............. *H04B 1/74* (2013.01); *H04B 7/026* (2013.01); *H04L 1/007* (2013.01); *H04L 1/0009* (2013.01);
(Continued)

(58) Field of Classification Search
CPC ........ H04B 1/74; H04B 7/026; H04B 1/3805; H04W 4/20; H04L 1/0014; H04L 1/0009;
(Continued)

(56) References Cited

U.S. PATENT DOCUMENTS

2003/0128769 A1* 7/2003 Kim ...................... H04L 1/0048
375/265
2005/0064908 A1* 3/2005 Boariu ................... H04B 7/061
455/562.1
(Continued)

FOREIGN PATENT DOCUMENTS

CN 104468066 A 3/2015
EP 2605421 A1 6/2013
(Continued)

OTHER PUBLICATIONS

Yao, Kung et al., "Detection and Estimation for Communication and Radar Systems," Cambridge University Press, 2013.

*Primary Examiner* — Asghar H Bilgrami
(74) *Attorney, Agent, or Firm* — Oliff PLC

(57) ABSTRACT

An improved mobile/cellular/wireless communication method e.g. for use-cases in which portions ("important signal" or "needed signal") of a signal ("original signal") are of particular interest in a given situation but not adequately received in that situation, the method comprising generating an auxiliary signal operative e.g. to bridge between imperfect ability/ies of the transmitters in the situation, and specific needs of the receivers in the situation, and/or to improve reception of the important signal and/or important signal information; and transmitting at least the auxiliary signal to the receiving end such that a representation of characteristics of the important signal, comprising the important signal itself and/or important signal information
(Continued)

characterizing the important signal, is replaced enhanced or augmented by the auxiliary signal, at the receiving end.

37 Claims, 26 Drawing Sheets

(51) Int. Cl.
*H04L 5/00* (2006.01)
*H04L 1/00* (2006.01)
*H04W 4/20* (2018.01)
*H04L 1/08* (2006.01)
*H04B 7/155* (2006.01)

(52) U.S. Cl.
CPC .......... *H04L 1/0014* (2013.01); *H04L 1/0083* (2013.01); *H04L 5/0094* (2013.01)

(58) Field of Classification Search
CPC ..... H04L 5/0094; H04L 1/007; H04L 1/0083; H04L 1/0003; H04L 1/08
See application file for complete search history.

(56) References Cited

U.S. PATENT DOCUMENTS

| | | | |
|---|---|---|---|
| 2009/0092085 A1* | 4/2009 | Ramesh | H04L 1/0083 370/329 |
| 2010/0039980 A1* | 2/2010 | Unger | H04B 7/026 370/315 |
| 2010/0284446 A1* | 11/2010 | Mu | H04B 7/15521 375/211 |
| 2013/0090141 A1* | 4/2013 | Hottinen | H04W 72/1231 455/501 |
| 2013/0185062 A1* | 7/2013 | Krishnan | G10L 19/008 704/219 |
| 2013/0301487 A1* | 11/2013 | Khandani | H04B 1/123 370/278 |
| 2015/0180629 A1* | 6/2015 | Lorca Hernando | H04J 11/00 370/330 |

FOREIGN PATENT DOCUMENTS

| | | | | |
|---|---|---|---|---|
| WO | 2010/141762 A1 | 12/2010 | | |
| WO | 2014/068555 A1 | 5/2014 | | |
| WO | WO-2014068555 A1 * | 5/2014 | ......... | H04B 7/15507 |
| WO | 2014/188414 A1 | 11/2014 | | |

\* cited by examiner

Figure-22

2210: optionally, receiving knowledge re specific charcteristics (e.g. an expected level of SNR) at which transmission is to occur, e.g. using info received dynamically from the Rx (receiver) end.
↓
2220: generating an auxiliary signal from an original signal e.g. by suitably augmenting or modifying or extracting important signal information or strengthening an" important (also termed herein "needed") signal within the original signal,
e.g. by performing at least one of:
a. use more power to transmit the needed signal
b. transmit at a certain frequency or several consecutive frequencies known to provide better reception given the current communication situation
c. transmit at a different waveform then the important signal that is transmitted from the transmitter (e.g. different modulation and/or different error correction code, etc.)
and wherein the auxiliary signal includes a baseband, having added robustness relative to the original signal, on which baseband, in addition optionally, at least one manipulation is performed (e.g. frequency shifts and/or spectrum spreading)
↓
2230: transmitting the auxiliary signal from an AST to the receiving end and in addition, transmitting the original signal from a Tx (transmitter) to the receiving end, including using an AST for generation and transmission of the auxiliary signal; wherein AST-Tx (transmitter to AST) communication is good enough (e.g. due to AST-Tx co-location) to ensure that the important signal is received by the AST well enough to enable the AST to fix or enhance the important signal before sending it to the ASR
↓
2240: at the rx end, receiving the auxiliary signal e.g. only when activated; and if the auxiliary signal is received, replacing or enhancing an important signal (portion within the original signal) or important signal information by the auxiliary signal, at the receiving end, using an ASR, wherein ASR-Rx (ASR to receiver) communication is good enough (e.g. due to ASR-Rx co-location) to ensure that the important signal or important signal information can be transmitted adequately from the ASR to the Rx.

SYSTEM FOR GENERATING, TRANSMITTING AND RECEIVING AUXILIARY SIGNALS AND METHODS USEFUL IN CONJUNCTION THEREWITH

REFERENCE TO CO-PENDING APPLICATIONS

PCT Application No. PCT/IL2016/050604 "System for generating, transmitting and receiving auxiliary signals and methods useful in conjunction therewith" which claims priority from Israel patent application No. 239333 filed on Jun. 10, 2015.

FIELD OF THE INVENTION

The present invention relates generally to wireless communication systems and more particularly to transmission and reception enhancement in wireless communication systems.

BACKGROUND AND SUMMARY OF THE INVENTION

Typically communication systems and protocols include several channels and signals that together operate as a comprehensive wireless standard, system or protocol. Each signal or channel has its own role. There are physical channels and there are logical channels as well. There are for example control channels that are responsible of transferring control information between the wireless communication nodes. In addition there are data/traffic channels that are responsible of transferring the user data between the nodes. Examples of these various channels for the LTE standard are described at FIG. 3.

Sometimes there are cases in which the features of specific signal and/or channel and/or part of the transmission and/or part of signal and/or part of channel (will be termed "Important Signal") of a communication system or protocol are not suitable for specific need of a user that wants to use this standard/protocol in a new scenario and/or is very important for the user and therefore proper reception of it is vital for the user. In example, scenarios with higher interference as a result of many nearby small cells in a cellular network or in another example, in mobile relays network that uses a protocol that is planned for a static network (such as but not limited to the first releases of the LTE). In these cases there is a need to adapt the specific signal/channel/transmission or to replace it by additional auxiliary signal.

Layer 1, 2 and 3 relays are known.

Many different communication protocols such as but not limited to LTE, 3G UMTS, WiMAX, WiFi, OFDMA, CDMA and TDMA are known.

Receivers which recognize elements of a known protocol, such as cyclic prefixes, are known.

Published PCT application NO. WO2014188414 describes a receiver, system and method for frequency diversity communications using beacon and methods useful in conjunction therewith and is hereby incorporated by reference.

The disclosures of all publications and patent documents mentioned in the specification, and of the publications and patent documents cited therein directly or indirectly, and of specifications of mentioned protocols are hereby incorporated by reference.

Algorithms which lock onto the frequency of a signal are known. These algorithms tend to be more successful when operating on simple signals, or signals having statistical characteristics selected to facilitate rapid measurement of frequency. For example, these algorithms tend to be more successful when operating on CW signals, as opposed to complex information-carrying signals.

SUMMARY OF THE INVENTION

In accordance with an aspect of the presently disclosed subject matter, there is provided a wireless communication system according to any of the embodiments herein.

Embodiment 1

An improved mobile and/or cellular and/or wireless communication method particularly suited for use-cases in which certain portions ("important signal" or "needed signal") of a signal ("original signal") are on the one hand of particular interest in a given situation but on the other hand are not adequately received in that situation, the method comprising:

generating an auxiliary signal operative e.g. to bridge between at least one imperfect ability of the transmitters in the situation, and specific needs of the receivers in the situation, and/or to improve reception of at least one of: the important signal and important signal information; and transmitting at least the auxiliary signal to the receiving end such that a representation of characteristics of the important signal, comprising at least one of: the important signal itself and important signal information characterizing the important signal, is replaced or enhanced or augmented by the auxiliary signal, at the receiving end.

Embodiment 2

A method according to embodiment 1 wherein the generating and transmitting are performed a plurality of times for a plurality of given situations respectively.

Embodiment 3

A method according to embodiment 1 wherein the generating and transmitting are performed using a protocol whose operation was designed assuming a different situation such that the protocol is imperfect in the given situation.

Embodiment 4

A method according to any of the preceding embodiments or embodiment 1 wherein the auxiliary signal is generated from the original signal and/or from the important signal and is transmitted in addition thereto.

Embodiment 5

A method according to any of the preceding embodiments or embodiment 4 wherein the auxiliary signal is generated from the original signal and/or from the important signal and is transmitted simultaneously therewith.

Embodiment 6

A method according to any of the preceding embodiments wherein the auxiliary signal is generated and transmitted by an AST and wherein AS-Tx (transmitter to AST) communication is good enough (e.g. the two device are physically close enough or are communicating under conditions which are good enough) to ensure that the important signal is received accurately by the AST or at least is received well enough to enable the AST to fix the important signal before sending it to the ASR.

Embodiment 7

A method according to any of the preceding embodiments wherein the auxiliary signal is received by an ASR and wherein the ASR-Rx (ASR to receiver) communication is good enough (e.g. the two device are physically close enough or are communicating under conditions which are good enough) to ensure that the important signal can be transmitted adequately from the ASR to the Rx.

Embodiment 8

A method according to any of the preceding embodiments wherein the auxiliary signal is generated from the original signal and/or from the important signal by suitably augmenting or modifying or strengthening the "important signal" within the original signal.

Embodiment 9

A method according to any of the preceding embodiments wherein the important signal (at least) may pass from the original signal's Tx to the AST wirelessly.

Embodiment 10

A method according to any of the preceding embodiments wherein the Tx and AST are co-located.

Embodiment 11

A method according to any of the preceding embodiments or embodiment 6 wherein the AST includes a needed (e.g. important) signal detector which is pre-programmed to identify the needed (e.g. important) signal within the original signal.

Embodiment 12

A method according to any of the preceding embodiments wherein the AST includes a needed (e.g. important) signal detector which is programmed to receive dynamic information identifying needed components for a given dynamic use-case and/or communication situation and to use said dynamic information to identify the needed signal within the original signal.

Embodiment 13

A method according to any of the preceding embodiments wherein the AST includes an auxiliary signal generating functionality operative to receive the needed (i.e. "important") signal from the detector 842 and to determine that the needed signal requires adaption if the needed signal is to be adequately received by the Rx; the auxiliary signal generating functionality then generates an auxiliary signal which will ensure this.

Embodiment 14

A method according to any of the preceding embodiments or embodiment 13 wherein the auxiliary signal generating functionality ensures this by performing at least one of:

use more power to transmit the needed signal;

transmit at a frequency which is known, given the current communication situation, to provide adequate reception or better reception (relative to a frequency stipulated in a protocol used to transmit the original signal whose underlying assumptions differ from the current situation);

present the needed signal as a different waveform; and transmit using different antenna configuration or multi antenna scheme.

Embodiment 15

A method according to any of the preceding embodiments or embodiment 13 wherein the auxiliary signal generating functionality comprises an auxiliary signal generator operative to generates the auxiliary signal's baseband.

Embodiment 16

A method according to any of the preceding embodiments or embodiments 13-25 wherein the auxiliary signal generating functionality comprises an auxiliary signal manipulator which performs manipulation on the baseband and/or intermediate frequency (IF) and/or radio frequency (RF) at the output of the auxiliary signal generating functionality.

Embodiment 17

A method according to any of the preceding embodiments or embodiment 16 wherein said manipulation includes at least one of:
   up frequency conversion,
   down frequency conversion,
   frequency hopping,
   spreading (spread spectrum),
   increasing the power at which the auxiliary signal is transmitted, and
   transmitting using adequate antenna configuration or multi antenna scheme.

Embodiment 18

A method according to any of the preceding embodiments wherein the auxiliary signal generator provide added robustness to the auxiliary signal's baseband relative to the original signal by performing at least one of:
   using better error correction code relative to the original signal e.g. error correction code which is better, in the given communication situation, than the error correction code mandated by a protocol used to transmit the original signal,
   decreasing or otherwise modifying modulation of original signal,
   changing the OFDM or PFK or FSK;
   using adequate antenna configuration or multi antenna scheme e.g. configuration or scheme adequate for the given situation e.g. as opposed to the configuration or scheme mandated by a protocol used to transmit the original signal.

Embodiment 19

A method according to any of the preceding embodiments or embodiment 15 or 18 wherein the auxiliary signal generator knows that the auxiliary signal needs to be received in an inferior situation which is noisier (lower SNR) and/or suffers from more interference and/or from lower SINR) than the original signal was planned to be received in and wherein the auxiliary signal generator selects at least one characteristic for the auxiliary signal which is suitable for the specific level of SNR or/and SINR and/or interference characterizing the inferior situation.

Embodiment 20

A method according to any of the preceding embodiments or embodiment 19 wherein the level of SNR or/and SINR is known in advance.

Embodiment 21

A method according to any of the preceding embodiments or embodiment 19 wherein the level of SNR or/and SINR is received from an external source.

Embodiment 22

A method according to any of the preceding embodiments or embodiment 19 wherein the level of SNR or/and SINR is received dynamically from the Rx end.

Embodiment 23

A method according to any of the preceding embodiments or embodiment 19 wherein the level of SNR or/and SINR is derived from information received dynamically from the Rx end.

Embodiment 24

A method according to any of the preceding embodiments wherein the receiving end comprises apparatus for diagnosing quality of reception of the received important signal and how the quality, if low, may be remedied.

Embodiment 25

A method according to any of the preceding embodiments wherein channel information passes from the ASR back to the AST and wherein the ASR and AST are respectively close enough to the Rx and Tx such that the Tx-Rx and AST-ASR channels are similar, hence the channel information reaching the AST will also characterize the Rx-Tx channel.

Embodiment 26

A method according to any of the preceding embodiments or embodiment 6 wherein the AST transmits the auxiliary signal continuously.

Embodiment 27

A method according to any of the preceding embodiments or embodiment 7 wherein the ASR only receives when in an active state.

Embodiment 28

A method according to any of the preceding embodiments or embodiment 27 wherein said active state is triggered by the receiver if reception of the original signal as a whole or only of the important signal, if known to the receiver, is deemed inadequate.

Embodiment 29

A method according to any of the preceding embodiments or embodiment 27 or 28 wherein the receiver is battery-powered.

Embodiment 30

A method according to any of the preceding embodiments or embodiment 24 wherein the ASR determines whether to activate and/or to de-activate and/or to put in standby mode one or more of the ASR's internal blocks based at least in part on the reception quality of the important signal at the ASR.

Embodiment 31

A method according to embodiment 2 wherein at least one characteristic of the auxiliary signal changes each time the generating and transmitting are performed, as a function of the plurality of given situations respectively, thereby to bridge between imperfect abilities of the transmitters which may differ over the plurality of situations, and specific needs of the receivers which may differ over the plurality of situations.

BRIEF DESCRIPTION OF THE DRAWINGS

Certain embodiments of the present invention are illustrated in the following drawings:

FIG. 7 shows the system before using the AST+ASR and FIGS. 7b,7c,7d shows various alternatives of the same system after using the AST+ASR.

FIG. 22 is a simplified flowchart illustration of an improved communication method for use cases in which certain portions ("important signal" or "needed signal") of a signal ("original signal") are on the one hand of particular interest in a given situation but on the other hand are not adequately received in that situation.

Figure 1A:
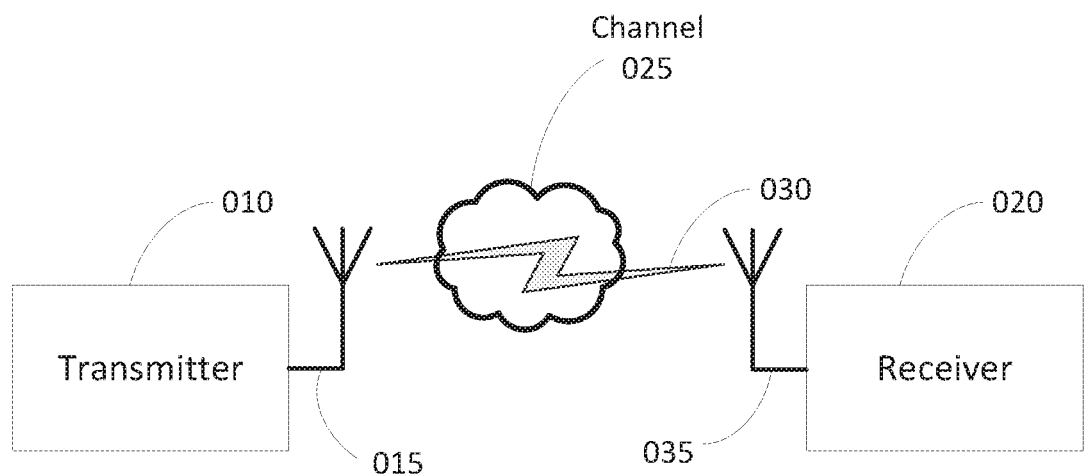
FIG. 1a (Prior Art) depicts a typical wireless communication system comprising a transmitter and a receiver.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Certain embodiments include an improved mobile and/or cellular and/or wireless communication system particularly suited for use-cases in which certain portions of a signal ("original signal") are on the one hand of particular interest in a given typically ad-hoc situation but on the other hand are not adequately received in that situation. These signal portions of particular interest are termed herein the "important signal" or "needed signal". for example, these portions might currently be utilized for a purpose which differs from the original purpose (e.g. different range, different channel model, different interference scenario, etc.) envisaged by a particular protocol.

Whether for this reason or any other, these portions are currently being transmitted at a range or noise level for which they are not suited e.g. because the original protocol did not envisage that these portions would be transmitted under these conditions. And/or, for example, these portions are currently being transmitted in the presence of more base stations than originally contemplated or using mobile base stations rather than stationary base stations, and for one or more of these reasons, say, the portions are not being adequately received. It is appreciated that e.g. if transmission of a signal occurs under different conditions than earlier used or envisaged, some (first) components of the signal may be received perfectly adequately (at least for the purpose of a certain use-case) whereas other (second) components of the signal may be received inadequately. Given another use case and/or different conditions, the first components of the signal may be received inadequately (at least for the purpose of the current certain use-case) whereas other (second) components of the signal may be received adequately.

To handle this type of occurrence, an auxiliary signal may be generated to "bridge" between the imperfect abilities of the transmitters in the new situation, and the specific needs of the receivers in the same situation. Typically, the auxiliary signal is generated from the original signal and is transmitted in addition thereto (e.g. simultaneously with) rather than instead of. It can be implemented, e.g., when the important signal is periodic signal such as the case in typical synchronization signals or common broadcast channels of wireless protocols. The functionality which transmits the auxiliary signal is termed herein the AST (auxiliary signal transmitter); the functionality which receives the auxiliary signal is termed herein the ASR (auxiliary signal receiver).

The AST may be integrally formed with the Tx (transmitter) or may be separate e.g. retrofit or/and add-on. Similarly. The ASR may be integrally formed with the Rx (receiver) or may be separate e.g. retrofit or/and add-on. The ASR may (FIGS. 6a, 6b, 6c) or may not be co-located with the Rx; if it is not then wireless ASR-Rx communication may be provided e.g. as shown in FIG. 6b. Similarly, The AST may (FIGS. 6a, 6c) or may not be co-located with the Tx; if it is not then wireless AST-Tx communication may be provided e.g. as shown in FIG. 6b. However typically, the AST and Tx communication is good enough (e.g. the two device are physically close enough or are communicating under conditions which are good enough) to ensure that the important signal is received accurately by the AST or at least is received well enough to enable the AST to fix the important signal before sending it to the ASR. Similarly, typically, the ASR and Rx communication is good enough (e.g. the two device are physically close enough or are communicating under conditions which are good enough) to ensure that the important signal can be transmitted adequately from the ASR to the Rx.

Co-location of the ASR-Rx (or wireless communication therebetween) is independent of whether or not the AST and Tx are co-located (or have wireless communication therebetween) and vice versa.

Typically, the auxiliary signal is generated from the original signal by suitably augmenting or modifying or enhancing or strengthening the "important signal" within the original signal. The important signal (at least) may pass from the original signal's Tx to the AST either via direct physical connection (e.g. wire) or wirelessly.

Figure 14A:
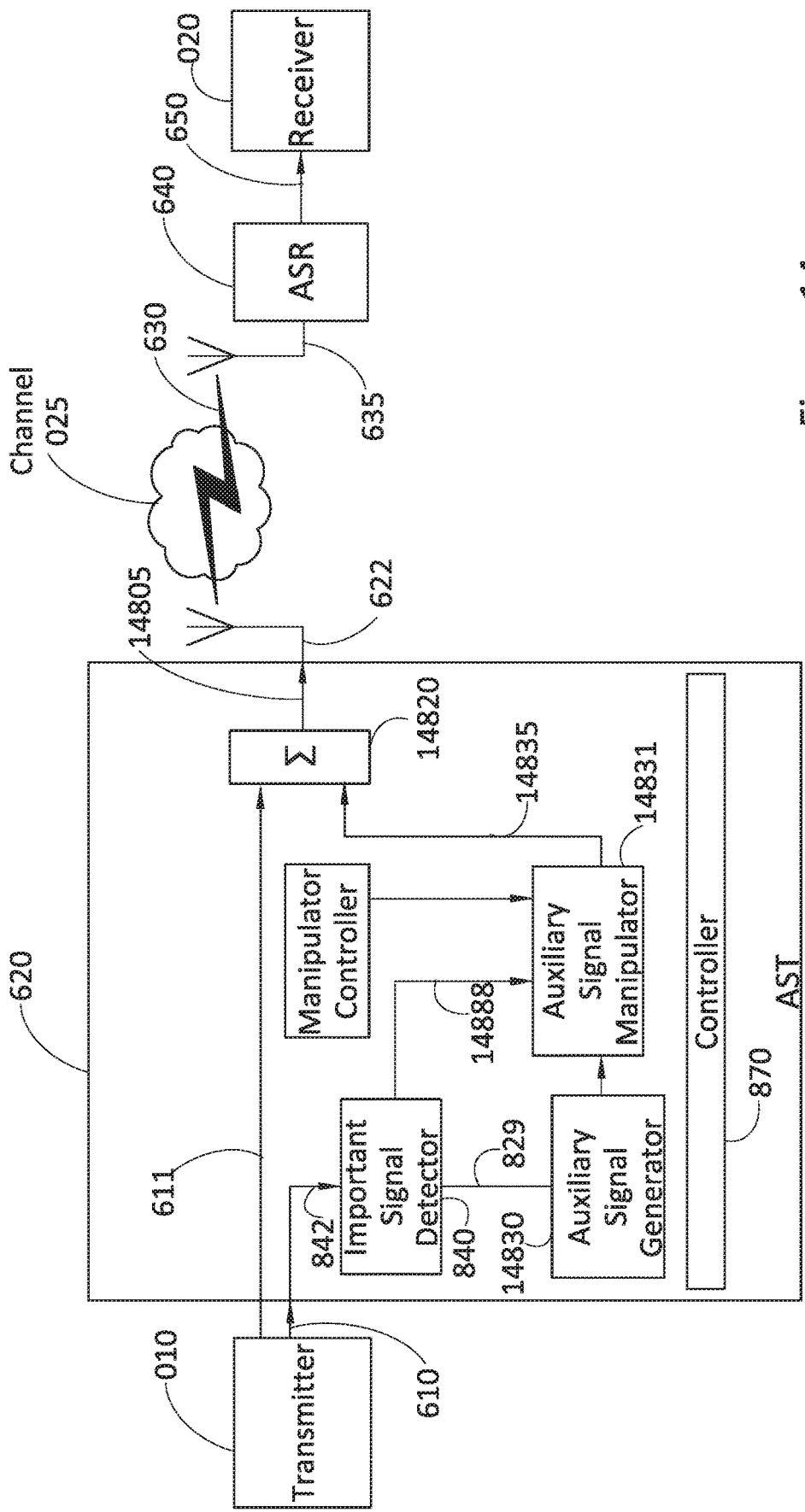
FIG. 14a,14b,14c are internal block diagram of an examples of implementation of the Auxiliary Signal Transmitter (AST) portion of the auxiliary signal apparatus comprising an auxiliary Signal generator, according to an embodiment of the present invention.
Figure 14B:
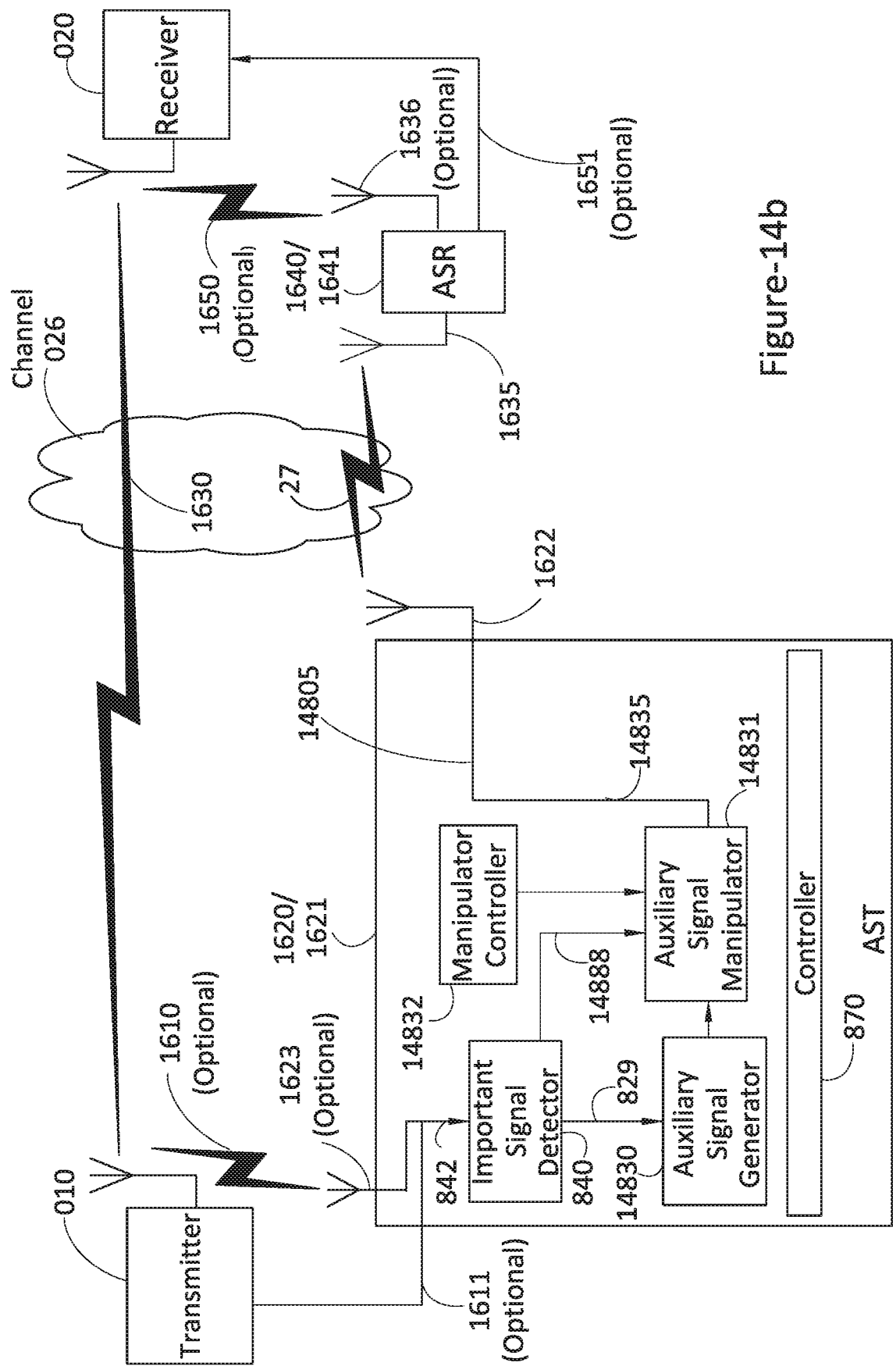
Figure 14C:
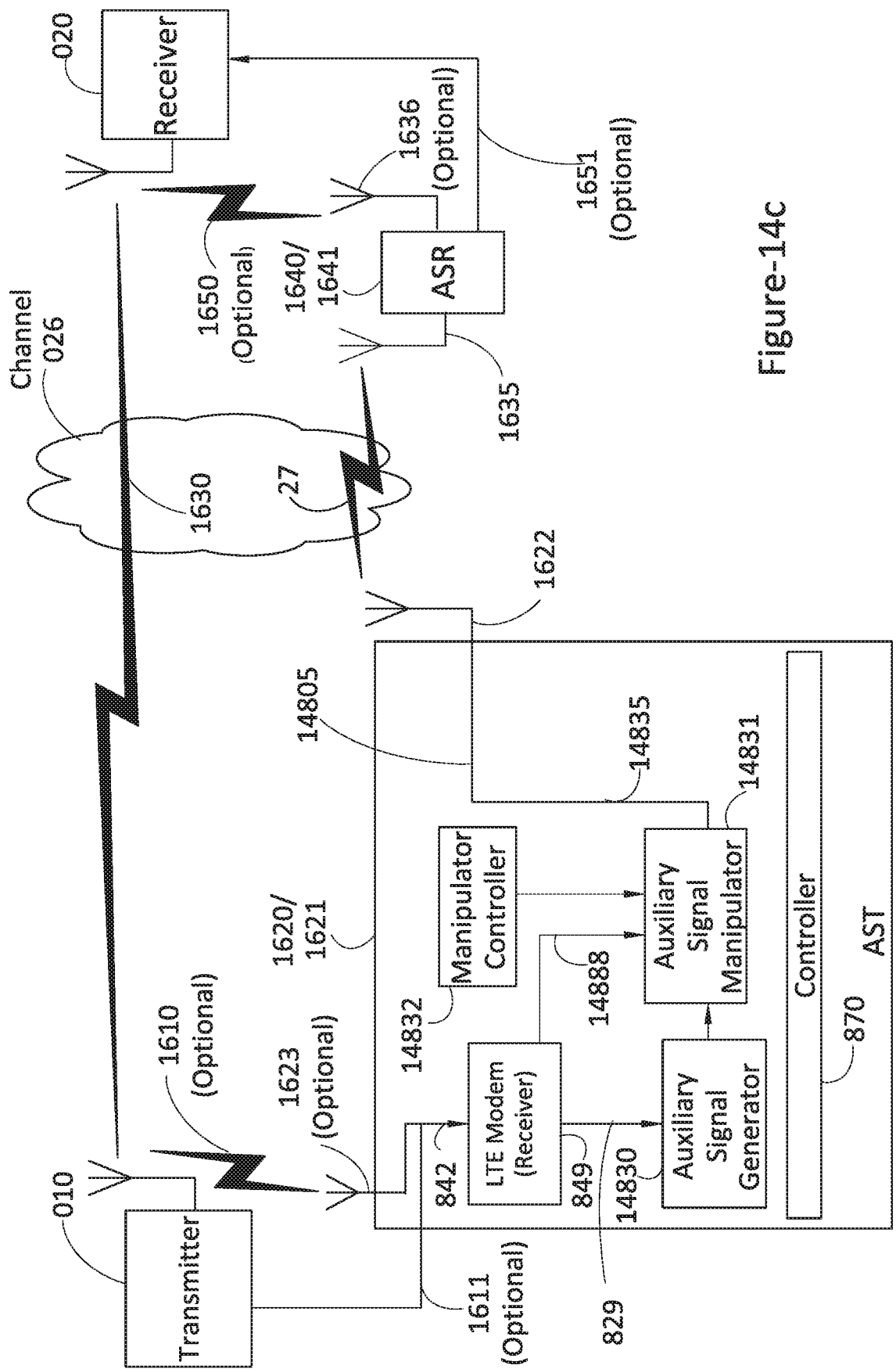

According to certain embodiments, e.g. as shown in FIGS. 14, 14b, 14c, a needed signal detector receives the original signal from the transmitter and identifies the needed signal therewithin. (The receiver end may also provide information, to the transmitter end, about the extent to which the Rx is or is not receiving these needed component/s successfully e.g. as described in detail below.) The needed signal detector may be pre-programmed or pre-configured to identify the needed signal, or may receive dynamic information identifying needed components for a given dynamic use-case and/or communication situation.

It may be the case that the AST and other components e.g. of FIG. 14, 14b, 14c may be programmed differently at different times e.g. re-programmed or dynamically configured over time. The needed signal detector may have different modes of operation, e.g., operational or non-operational, and thereafter it makes one or more blocks within the AST operational or non-operational.

For example, the detector 842 may be pre-programmed, or be dynamically configured, to identify a synchronization signal or a broadcast channel or a control channel or an uplink map or a downlink map, or any combination thereof, as the needed/important signal.

Figure 18:
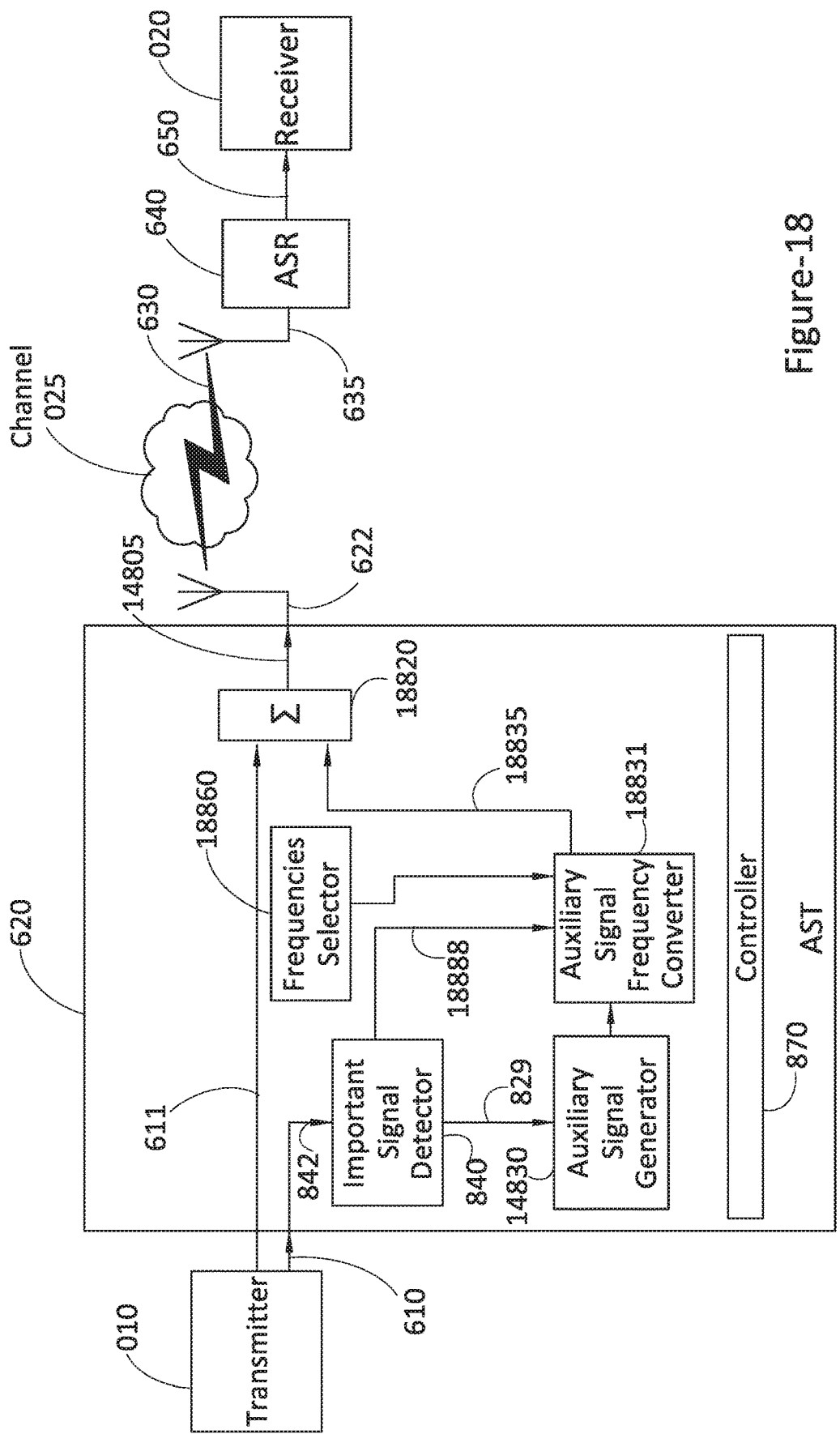
FIGS. 18,19 depicts block diagrams of example of implementation of auxiliary signal transmitter (AST)/Auxiliary Signal Receiver (ASR) with the auxiliary signal manipulator/dc-manipulator being frequency converter according to an embodiment of the present invention.
Figure 19:
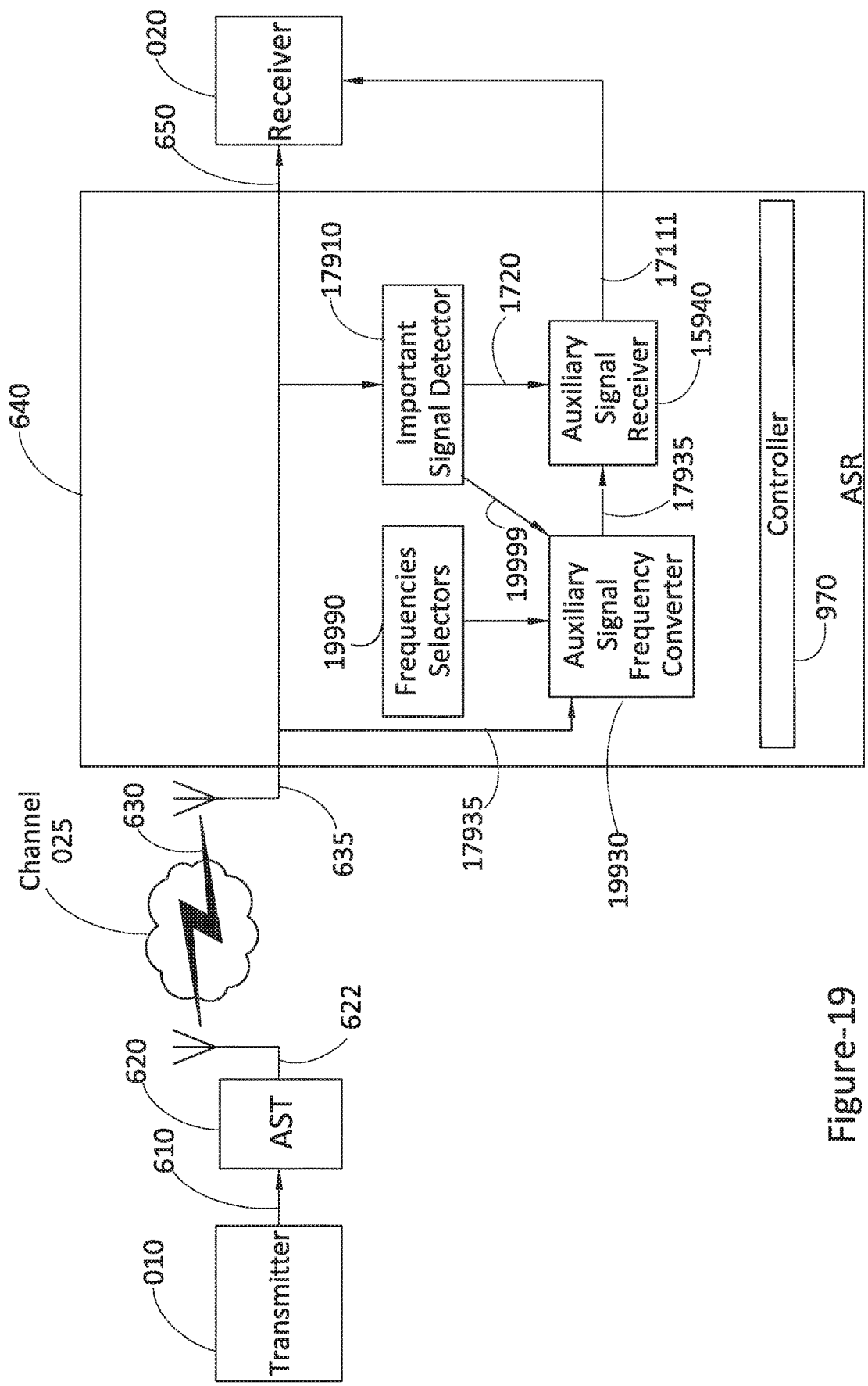

An auxiliary signal generating functionality may receive the needed (i.e. "important") signal from the detector and may determine that the needed signal requires adaptation/enhancement if the needed signal is to be adequately received by the Rx (e.g. it gets feedback from the ASR regarding the reception conditions at the receiver side); the auxiliary signal generating functionality then generates an auxiliary signal which will ensure this. For example, the auxiliary signal generating functionality may use more power to transmit the needed signal and/or may transmit at a frequency (e.g. as shown in FIGS. 18-19) which is known to provide better reception given the current communication situation and/or may present the needed signal as a different waveform.

It is appreciated that the auxiliary signal generating functionality may comprise an auxiliary signal generator 14830 and/or an auxiliary signal manipulator 14831. Typically, generator 14830 generates the auxiliary signal's baseband and the manipulator 18931 performs manipulation on the baseband such as but not limited to any or all of: up frequency conversion, down frequency conversion, spreading of the baseband, increasing the power.

The baseband generated by generator 14830 may even be identical to that of the original signal. Alternatively, the generator 14830 may use stronger error correction code relative to the original signal, and/or may decrease or otherwise modify modulation, and/or may change the OFDM or PSK or FSK and/or otherwise "strengthen" or provide added robustness to the auxiliary signal's baseband relative to the original signal thereby to allow the auxiliary signal to be received even, say, in noisier (lower SNR) conditions. For example, it is known in the art which type of modulation is suitable for each specific level of SNR. The level of SNR may be known in advance, or received from an external source, or may be received dynamically from the Rx end or may be derived from information received dynamically from the Rx end.

Typically, the auxiliary signal is then transmitted (either on its own or incorporated into the original signal) from the AST e.g. to the ASR (or even direct to the Rx). So, the ASR and/or Rx may receive the original signal and the auxiliary signal, and/or may receive a signal which is similar to the original signal except that the important signal therein is replaced by the auxiliary signal generated by generator 14830.

To allow the auxiliary signal generator 14830 to determine whether or not the needed signal requires adaption, and which adaptation if so, if the needed signal is to be adequately received by the Rx, the Rx may comprise apparatus (incorporated within the AS de-manipulator and/or AS receiver and/or the AST antenna assembly) which may be conventional, for diagnosing quality of reception of the received important signal and how the quality, if low, may be remedied. Known techniques in detection and estimation theory may be employed for this purpose. "Detection and Estimation for Communication and Radar Systems" by Kung Yao, Flavio Lorenzelli and Chiao-En Chen, published January 2013 by Cambridge University Press, describes this known field.

According to certain embodiments, channel information may pass from the ASR back to the AST. If the ASR and AST are respectively close enough to the Rx and Tx such that the Tx-Rx and AST-ASR channels are similar, the channel information reaching the AST will also characterize the Rx-Tx channel.

According to certain embodiments, the AST transmits the auxiliary signal continuously but the ASR only receives when in an active state; this state may be triggered by the receiver 020 if reception of the original signal as a whole or only of the important signal, if known to the receiver, is deemed inadequate. This is advantageous in power-saving use cases e.g. if the receiver is battery-powered (e.g. a mobile phone's receiver).

Figure 15A:
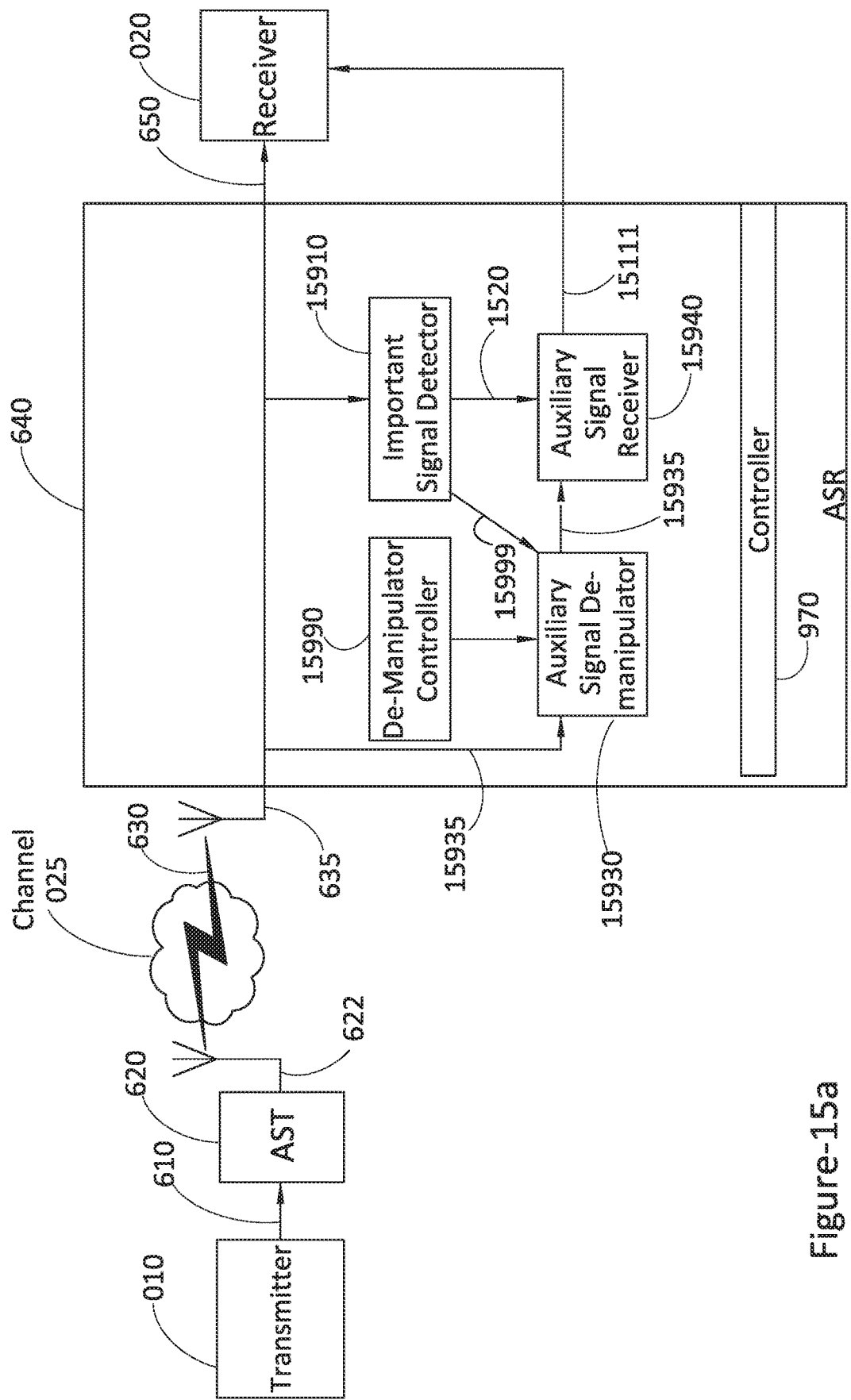
FIGS. 15a,15b depicts internal block diagram of an example implementation of the Auxiliary Signal Receiver (ASR) portion of the auxiliary signal apparatus comprising an auxiliary Signal receiver, according to an embodiment of the present invention.

It is appreciated that the methods and devices described in co-pending "Partial downlink repeater apparatus and methods useful in conjunction therewith", published as WO 2014068555 A1, may be used as would seem appropriate to the ordinarily skilled man of the art, to implement any of the following: needed signal detector 840 of FIG. 14; auxiliary signal generator 14830 of FIG. 14; auxiliary signal manipulator 14831 and both controllers and summer also in FIG. 14, components 15930, 15935, 15910, 15940 and the controller 970 in FIG. 15*a*.

The terms "channel" (or signal) is on occasion used herein to denote a portion of a signal (of a larger signal). The portion may be a physical portion, contiguous or non-contiguous, e.g. of the time-axis of a signal's frame and/or of the frequency-axis of a signal's frame. The portion may also be defined as a logical portion e.g. a defined item of information whose location within the signal, given a particular protocol, is known. The item of information may comprise actual user data but more typically comprises "protocol meta-data" such as, say, a synchronization signal or control signal e.g. an indication of a broadcast channel, used by the receiver for receiving and extracting the actual user data.

Certain example embodiments are now described with reference to the drawings.

FIG. 1*a* (Prior Art) depicts a typical wireless communication system comprising a transmitter 010 having a transmitting antenna 015, which transmits a wireless signal 030 through a channel 025. The wireless signal is then received e.g. using a receiving antenna 035 by a receiver 020.

Figure 1B:
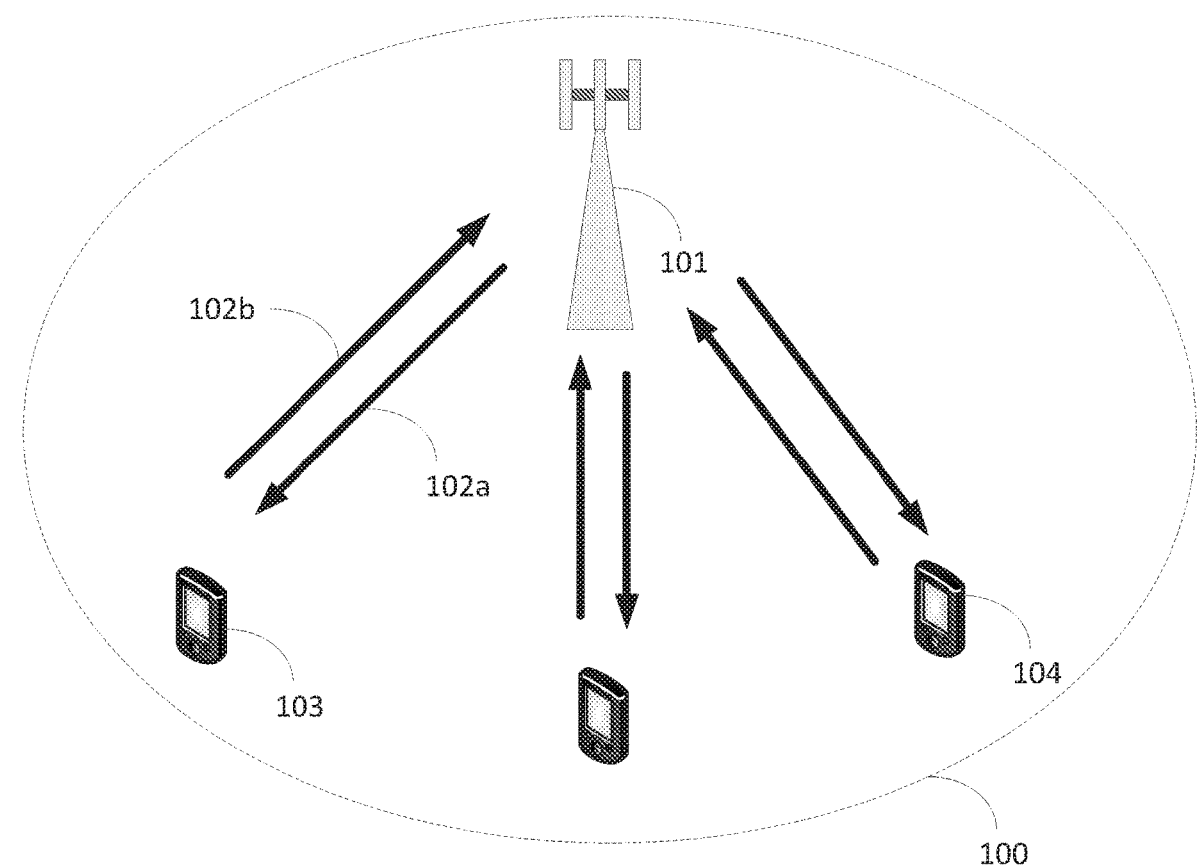
FIG. 1b depicts a typical cell or other network portion in a wireless e.g. cellular communication system.

FIG. 1*b* depicts a typical cell or other network portion in a wireless e.g. cellular communication system.

This embodiment typically includes a typical cell or other network portion 100 in a wireless e.g. cellular communication system. A base station 101 transmits and receives signals to and from a plurality of mobile stations within its geographical coverage area. Such mobile stations are noted as 103 and 104. Each mobile station typically transmits an Uplink signal 102*b* to base station 101, and receives a Downlink signal 102*a* from base station 101. The communication system may be a cellular system, or alternatively any other wireless network.

The wireless (e.g.) communication system may implement one of the cellular standards, one of the wireless communication standards, or may implement some proprietary communication signals and protocols. For example, a cellular communication system may implement the 3GPP LTE standard, the WiMAX standard, the 3GPP WCDMA, HSPA or any other cellular standard. As a further example, the wireless communication system may implement one of the 802.11 WiFi standards.

Downlink 102*a* and Uplink 102*b* signals may be transmitted using TDMA, CDMA, FDMA. OFDMA, or any other method or combination of methods.

Figure 1C:
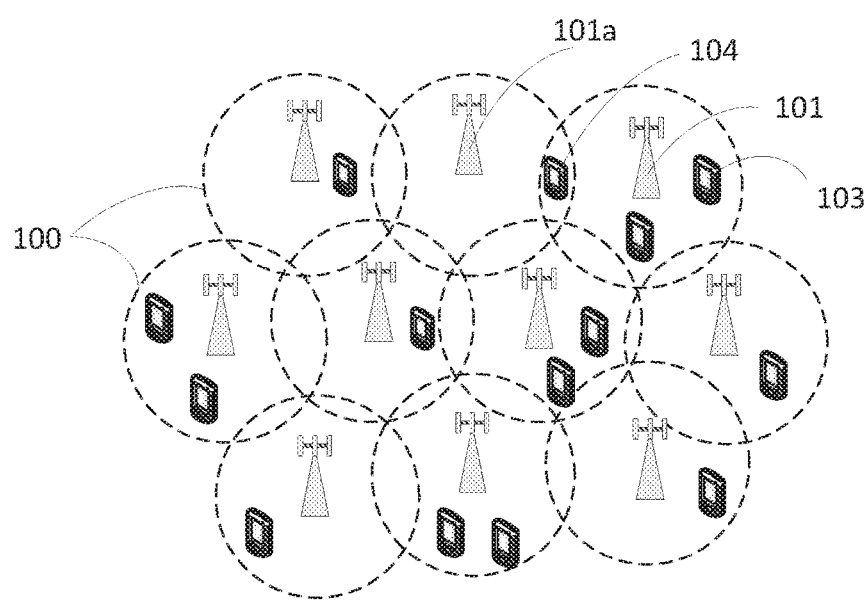
FIG. 1c depicts a cellular system comprising a plurality of cells; each of the cells e.g. as described above with reference to FIG. 1b.

FIG. 1*c* depicts a cellular system comprising a plurality of cells, each of the cells e.g. as described above with reference to FIG. 1*b*.

This embodiment typically includes a cellular system comprising a plurality of cells 100, each of which is described above regarding FIG. 1*b*. Some of the mobile stations may receive the downlink signals from their serving base stations in low quality. Such low quality signals may be caused by multipath, fading, inter-cell interferences, attenuation, or any other cause or combination of such. In such conditions, it may be difficult for the mobile station to maintain proper reception of the downlink signals from the base station.

For example, in one of the cells, base station 101 serves the mobile stations 103 and 104, amongst other mobile stations. Mobile station 104 also resides within the geographical coverage area of base station 101*a*; therefore mobile station 104 receives downlink signals from 2 base stations 101 and 101*a*, which causes lower quality reception of the desired downlink signal from base station 101.

Typically, in a cellular or wireless communication system, some of the downlink or/and uplink transmissions may include portions which are deemed more important or critical than other portions. Such important/critical portions are referred to as "Important signal/s" or "Needed Signal/s" herein below.

One example of an Important (or "Needed") signal is downlink synchronization signals, which may be deemed critical for the proper reception of the remaining downlink transmission. Another example is control and management messages, such as but not limited to, for example, the DL-MAP signal in WiMAX, the PDCCH or PBCH signal/channels in LTE and CCPCH signal in 3G UMTS, that the base station sends to the mobile stations; such control and management messages may be deemed critical for proper reception of the downlink transmission.

Another example of a signal which may be deemed Important is a portion of a downlink signal addressed to a mobile station which receives the downlink transmission in low quality, as described above. Another example is a portion of a downlink signal addressed to a mobile station which is a preferred mobile station (e.g. is deemed to have greater importance or higher priority over other mobile stations).

Such Important signals may vary from time to time, or from frame to frame. Such variations may be for example in the content (information) carried by the important signal, or in the important signal allocation within the frame. A signal deemed important at time T1, may no longer be deemed important at time T2. A signal deemed important in frame Fm1, may no longer be deemed important in later frame Fm2. Alternatively, the Important signals may be fixed over a sequence of frames or of time, in terms of the important signals' content and/or in terms of important signals' allocation. Further alternatively, the Important signals may vary gradually, for example may be fixed for several consecutive frames and then be deemed to have changed.

Figure 6A:
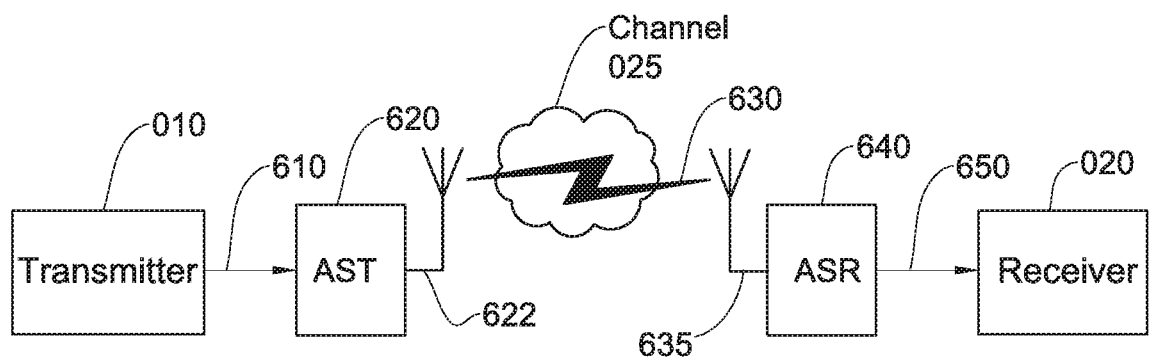
FIG. 6a depicts a wireless communication system incorporating an add-on auxiliary signal couple apparatuses at the transmitter side (AST, typically downstream of the Tx) and at the receiver side (Auxiliary Signal Receiver (ASR), typically upstream of the Rx).
Figure 6B:
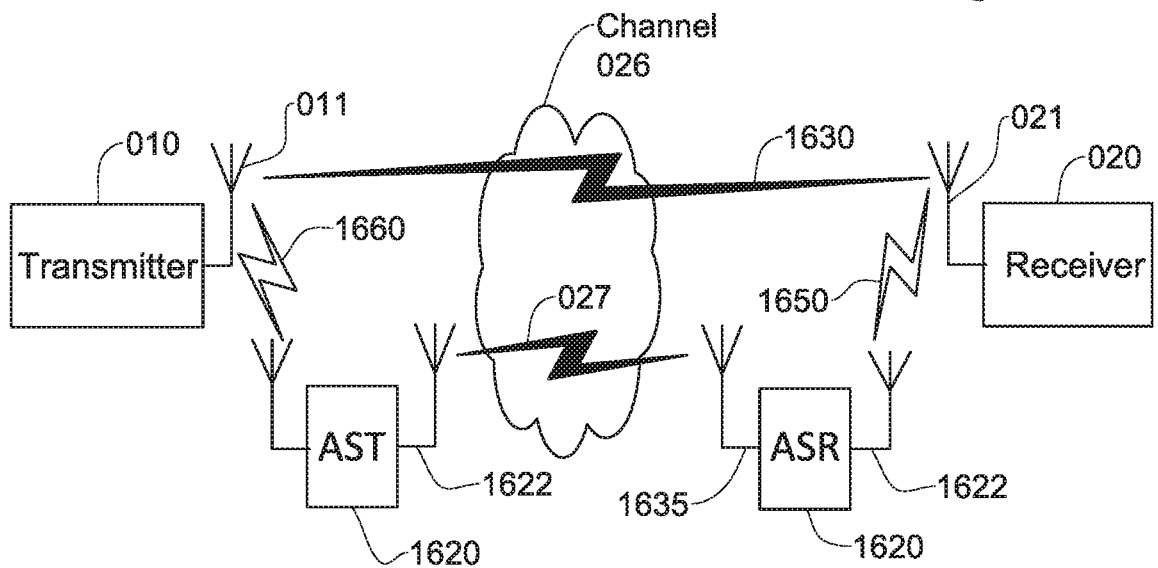
FIG. 6b illustrates a variation on the apparatus of FIG. 6b in which the Tx and Rx communicate directly, wirelessly, and the auxiliary signal transmitter (AST) and Auxiliary Signal Receiver (ASR) communicate in parallel, also wirelessly.

FIG. 6*a* depicts a wireless communication system incorporating an add-on auxiliary signal couple apparatuses at the transmitter 010 side (Auxiliary Signal Transmitter (AST) 620) and at the receiver 020 side (Auxiliary Signal Receiver (ASR) 640) according to an embodiment of the present invention.

Transmitter 010 typically resides in a wireless communication network node, e.g. 101, 103 or 104 of FIG. 1*b*. Receiver 020 typically resides in an additional wireless communication network node. For example, transmitter 010 may reside in mobile node 103 and receiver 020 may reside in base station 101. Typically, transmitter 010 has the capacity to communicate with receiver 020 over channel 025 according to a given communication protocol, e.g. LTE, WiMAX, WiFi, 3G cellular, Bluetooth, etc. The communication protocol may for example be an OFDM, OFDMA, CDMA, TDMA, FDMA protocol. Typically, transmitter 010 has the capacity to communicate with receiver 020 at a given ("original") center frequency.

At the transmitter side an Auxiliary Signal Transmitter (AST) 620 may be added. The interface 610 between the transmitter 010 and the Auxiliary Signal Transmitter (AST) 620 may be optionally at the RF frequency (e.g. the prior antenna interface at high power or at the RF frequency at low power before the power amplifier). Optionally it may be implemented at the IF (intermediate frequency) that may be typically low-power. Optionally it may be implemented at the base-band. At the receiver side, an Auxiliary Signal Receiver (ASR) 640 may be added. Accordingly, the interface between the Auxiliary Signal Receiver (ASR) 640 and the receiver 020 may be optionally in accordance with all the alternatives described above regarding the Auxiliary Signal Transmitter (AST) 620 and the transmitter 010. The function of the Auxiliary Signal Transmitter (AST) is to add the auxiliary signal to the communication system (which in the illustrated example is wireless but alternatively may be wired) in addition to the original signal. The Auxiliary Signal Transmitter (AST) 620 is then typically connected to a transmitting antenna 622 that typically is suited to the auxiliary signal characteristics, e.g. covers all the shifted frequencies that are implemented by the Auxiliary Signal Transmitter (AST). Optionally, additional components may be added between the Auxiliary Signal Transmitter (AST) and the antenna. e.g. a PA (Power Amplifier) and/or filters. In a similar manner, the receiving antenna 635 also typically is suited to the auxiliary signal characteristics, e.g. covers all the shifted frequencies and then is typically interfaced to Auxiliary Signal Receiver (ASR) 640 which typically receives the auxiliary signal and extracts therefrom the received Important signal or some of its characteristics (also termed herein parameters or features) 650 and then transfers the received signal or its extracted characteristics to the receiver 020. Thereafter, the received important signal 650 is received correctly by the receiver 020. Optionally, additional components may be added between the Auxiliary Signal Receiver (ASR) and the antenna. e.g. a LNA (Low Noise Amplifier) and/or filters.

In FIG. 6a the signal in the air 630 typically includes both the original signal and the auxiliary signal.

Typically, Transmitter 010 and Receiver 020 are standard (e.g. cellular) apparatuses, and may be off-the-shelf equipment operative to communicate with each other.

Typically, when the auxiliary signal center frequency varies along time, the frequency conversion (shift) varies in time, e.g. such that a different frequency shift is performed on the Auxiliary signal (typically not on the original signal) by the Auxiliary Signal Transmitter (AST) and Auxiliary Signal Receiver (ASR) over time, e.g. the alternative center frequency is changed from time to time during the communication between the receiver 020 and the transmitter 010. Optionally, a new frequency shift is performed periodically e.g. every predetermined time interval. Optionally, a new frequency shift is performed non-periodically, e.g. according to a predetermined control. Optionally, a new frequency shift is performed (or the important signal is inserted within the original signal transmission) during non-important signals of the transmission, thus minimizing the interference and the degradation to the received original transmission. Examples for placing a frequency shift or auxiliary signal/s at non important signals of the original signal/transmission are further described regarding FIGS. 2-5 below.

Optionally, the frequency shift of the auxiliary signal is taken from a predetermined list of frequency shifts. Further optionally, the frequency shift of the auxiliary signal is selected consecutively from said list. Alternatively, the frequency shift of the auxiliary signal is taken or configured from an external system. Alternatively, the frequency shift is computed according to a predetermined algorithm. Alternatively, an auxiliary Signal generator may generate several signals e.g. simultaneously, and these together may constitute an auxiliary Signal.

FIG. 6b describes an alternative implementation of AST and ASR as separate units with wireless interfaces 1610 and 1650 between the ASR and AST and the transmitter and the receiver. It can be seen that in this system configuration there is the original signal 1630 that is transmitted from the transmitter 010 and the receiver 020, and in addition there is the auxiliary signal 027 that is transmitted between the AST 1620 and ASR 1640. It can be seen that the AST 1620 has its own receiving antenna 1623 that received the transmitted original signal that is received by the AST 1610, and in addition it also has transmitting antenna 1622 that is transmitting the auxiliary signal.

Similarly, the ASR 1640 may typically have two antennas, receiving antenna 1635 for the reception of the auxiliary signal 027 and additional transmitting antenna 1636 for the transmission of the ASR-transmitted important signal 1650.

The auxiliary signal 027 may be with the same characteristics as the important signal within the AST-received original signal 1610. Alternatively, the auxiliary signal 027 may have different characteristics then the AST-received original signal 1610. These characteristics may include modulation, error-correction code, bandwidth, data-rate, power, center frequency, portion of the important signal (physical or logical), etc.

Figure 6C:
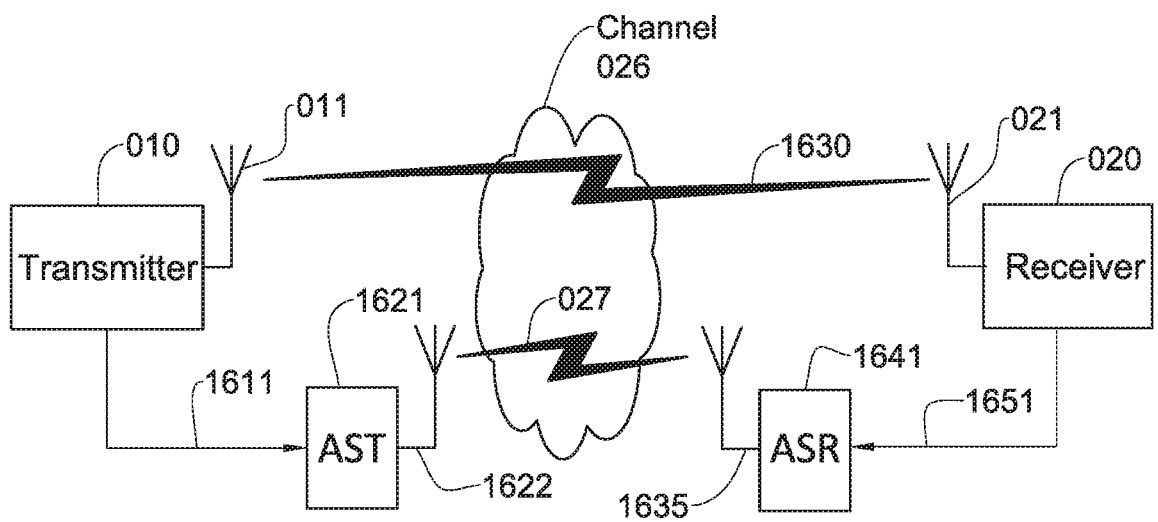
FIG. 6c illustrates a variation on the apparatus of FIG. 6b in which the Tx and Rx communicate directly, wirelessly, and the auxiliary signal transmitter (AST) and Auxiliary Signal Receiver (ASR) communicate in parallel, also wirelessly; also, the Tx and auxiliary signal transmitter (AST) communicate wirelessly between them as do the Rx and Auxiliary Signal Receiver (ASR).

FIG. 6c describes additional implementation of AST and ASR as interfaced units with direct interfaces (e.g. wired—in example copper or optical) between the ASR and AST and the transmitter and the receiver (these direct interfaces are 1611 and 1651). It can be seen that in this system configuration there is the original signal 1630 that is transmitted from the transmitter 010 and the receiver 020, and in addition there is the auxiliary signal 027 that is transmitted between the AST 1621 and ASR 1641. It can be seen that the AST 1621 has direct interface 1611 to the transmitter, in this interface it received the important signal information. The important signal information may be implemented typically in several alternatives: first example is by transmitting the original signal in this interface 1611 (either in radio frequency [RF], intermediate frequency [IF] or baseband) and then the AST will extract from this original signal the import and signal itself, second example may be by transmitting only the important signal in this interface 1611, third example may be by transferring in this interface 1611 only the data/information that is coded/implemented within the important signal (e.g. all or some of the bits that are coded within the important signal or e.g. the synchronization characteristics of the important signal such as timing, frequency and gain, etc.). The AST 1621 has also transmitting antenna 1622 that is transmitting the auxiliary signal.

Similarly, the ASR 1640 may typically have receiving antenna 1635 for the reception of the auxiliary signal 027 and additional direct interface 1651 to the receiver 020 for the transmission of the ASR-transmitted important signal information. Similarly, the ASR-transmitted important signal information may be implemented typically in several alternatives: first example is by transmitting the important signal itself in this interface 1651 (either in radio frequency [RF], intermediate frequency [IF] or baseband), second example may be by transferring in this interface 1651 only the data/information that is coded/implemented within the important signal (e.g. all or some of the bits that are coded within the important signal or e.g. the synchronization characteristics of the important signal such as timing, frequency and gain, etc.).

The auxiliary signal 027 may be with the same characteristics as the important signal within the AST-received original signal 1610. Alternatively, the auxiliary signal 027 may have different characteristics then the AST-received original signal 1610. These characteristics may include modulation, error-correction code, bandwidth, data-rate, power, center frequency, portion of the important signal (physical or logical), etc.

It should be noted that FIGS. 6a and 6b and 6c are only some examples of system configurations for the implementation of auxiliary signal. Any combination of these examples is also an embodiments incorporated. For example, a system with direct interface between the transmitter and the AST (as described in FIG. 6c) and wireless interface between the ASR and the receiver (as described in FIG. 6b). Or alternatively a system with wireless interface between the transmitter and the AST (as described in FIG. 6b) and direct interface between the ASR and the receiver (as described in FIG. 6c). Or alternatively and combination of transmitter AST interface of FIGS. 6a, 6b, 6c and ASR⇔receiver interface of FIGS. 6a, 6b, 6c.

Figure 7A:
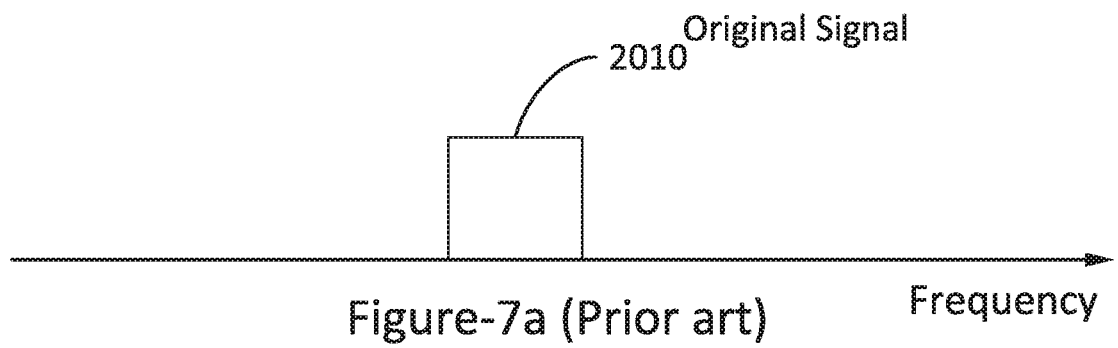
FIG. 7a,7b,7c,7d are simplified illustrations of the frequency behavior effect when using the auxiliary signal apparatuses (AST+ASR). In particular.
Figure 7B:
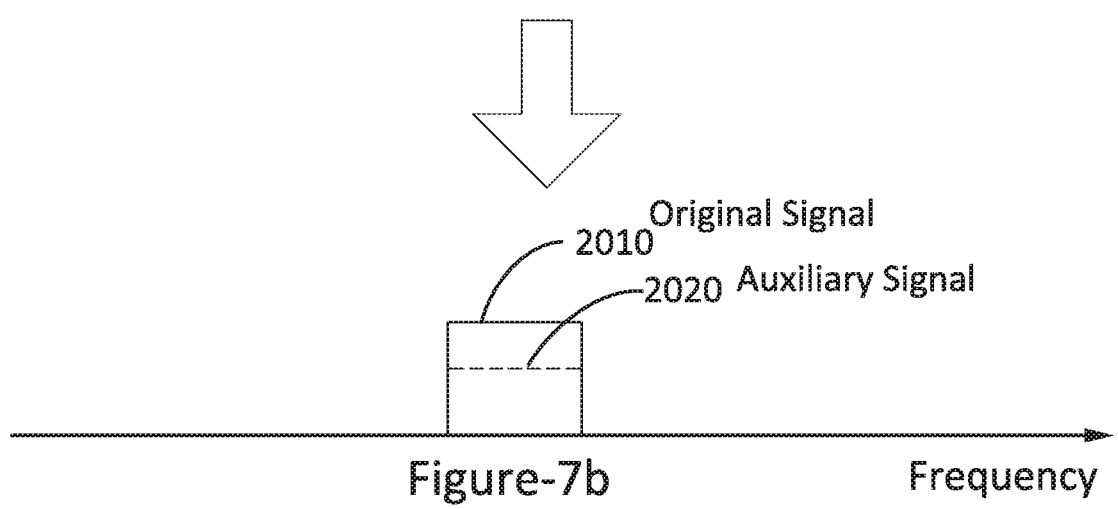

FIGS. 7a-7b are simplified illustrations of the frequency behavior effect when using the auxiliary signal apparatuses (ASR+AST) in which the auxiliary signal covers portion or all the original signal bandwidth.

FIG. 7a (Prior art) depicts the situation before using the ASR+AST. It may be seen that the original signal 2010 is located at the original center frequency and covers some bandwidth.

FIG. 7b depicts the situation after using the ASR+AST, according to an embodiment of the present invention. It can be seen that there are two signals: the original signal 201 and also the auxiliary signal 2020. In this figure it can be seen according to certain embodiments of the invention that the bandwidth of the auxiliary signal covers/occupy the same bandwidth of the original signal. Similarly to FIG. 7b, FIG. 7c exemplify auxiliary signal 2030 that covers/occupy part of the bandwidth of the original signal. Similarly to FIG. 7b, FIG. 7d exemplify auxiliary signal 2040 that occupy bandwidth that is wider than the original signal that covers all the bandwidth of the original signal 2010. Any other example may also be included in this invention such as auxiliary signal covering part of the bandwidth of the original signal and also bandwidth outside the original signal. In addition, the auxiliary signal may be continuous in the time domain or may be non-continuous in the time domain. Several example of non-continuous time domain will be presented in the following figures (e.g. 2, 3, 4, 5).

Figure 2:
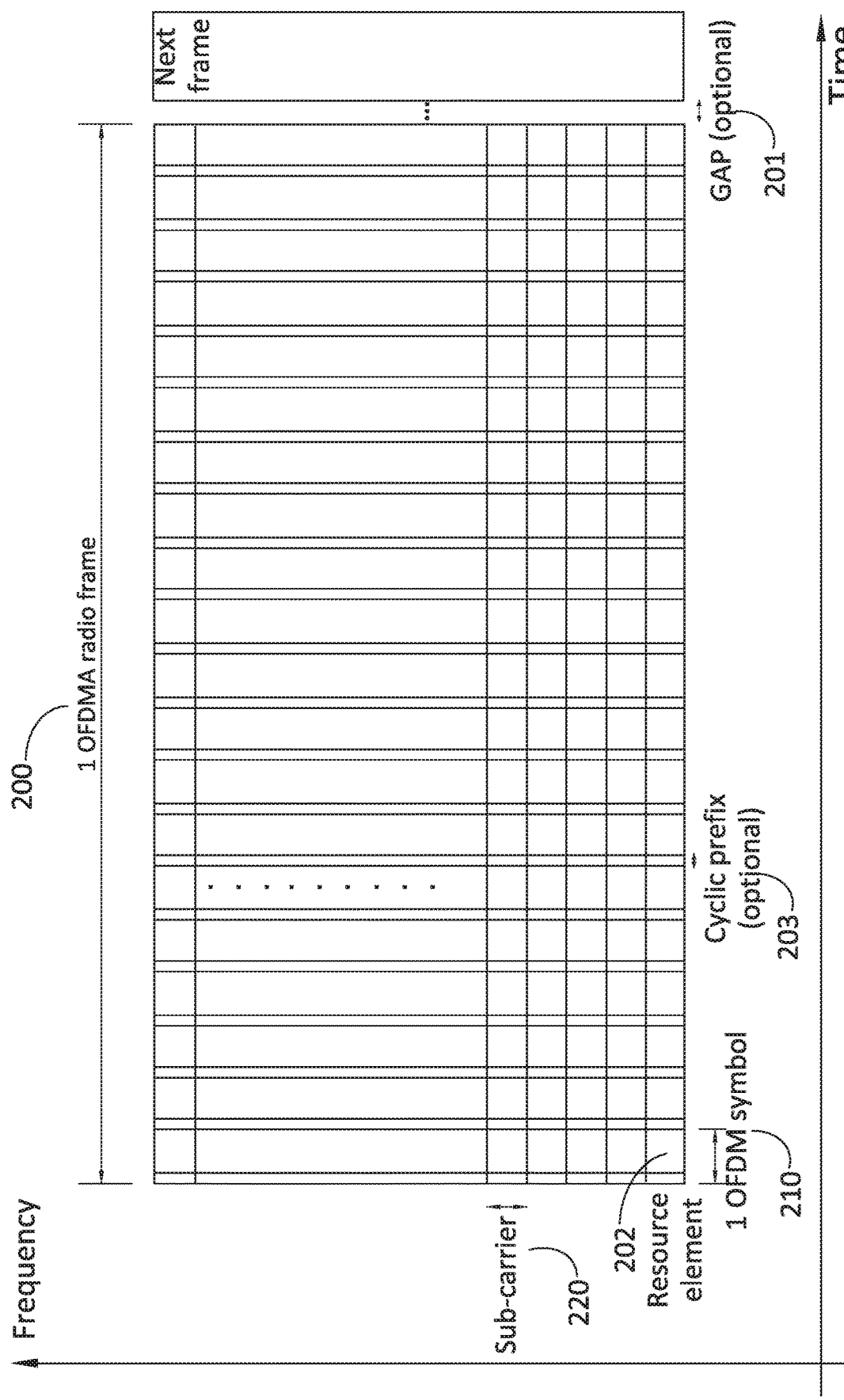
FIG. 2 depicts an OFDMA radio frame (either downlink or uplink), in an OFDMA FDD communication system implementing add-on auxiliary signal according to certain embodiments of the invention.

FIG. 2 depicts an OFDMA/OFDM radio frame 200 (either downlink or uplink), in an OFDMA FDD or TDD communication system implementing auxiliary signal according to certain embodiments of the invention.

This embodiment typically includes an OFDMA (or OFDM) radio downlink frame 200, in an OFDMA (or OFDM) communication system. Frame 200 typically comprises a plurality of OFDM symbols 210 in the time domain, and/or a plurality of subcarriers 220 in the frequency domain. An optional Gap 201 may be placed between successive frames 200. An optional Cyclic Prefix 203 may be provided e.g. between successive OFDM symbols in the time domain. A basic resource which may be allocated in the downlink transmission frame is resource element 202, which is the transmission of one subcarrier during one OFDM symbol length in time.

In the OFDMA (or OFDM) frame 200 there are several locations (in the frequency/time domains) that the auxiliary signal can be inserted within the original signal, e.g. as described above with reference to FIGS. 6a,6b,6c, may be implemented. Each of these locations typically implements a different auxiliary signal appearing rate. For example, the auxiliary signal may be inserted/transmitted during the cyclic prefix (CP) 203 of an OFDM/OFDMA symbol 210. The auxiliary signal may be inserted/transmitted during the cyclic prefix (CP) of every symbol or during the cyclic prefix (CP) of every several symbols. Alternatively, the auxiliary signal may be inserted/transmitted during un-important symbol duration (or during empty symbol—a symbol time that no data is transmitted). Alternatively, the auxiliary signal may be inserted/transmitted during the time gap 201 between consecutive frames. Each of the above examples may be regarded as a "non-important signal" of the transmission, in that improper reception of these signals is not as harmful to the receiver as other (critical/important) signals.

In another embodiment of the present invention which includes an OFDMA radio frame, an OFDMA TDD (Time Division Duplex) communication system add-on auxiliary signal is implemented according to certain embodiments of the invention. In the TDD system, both DL (downlink) and UL (uplink) frames may occupy the same frequency (center frequency) and are typically transmitted alternately. Between each one of these two frames there are typically guard gaps (e.g. between DL and UL, and between UL and DL). In each one, e.g., of these guard gaps the auxiliary signal may be inserted/transmitted. In this implementation, the rate of the auxiliary signal appearance is therefore typically the frames' shift rate. Typically, all locations in the frame described in FIG. 2 may also be used in the TDD system.

Figure 3:
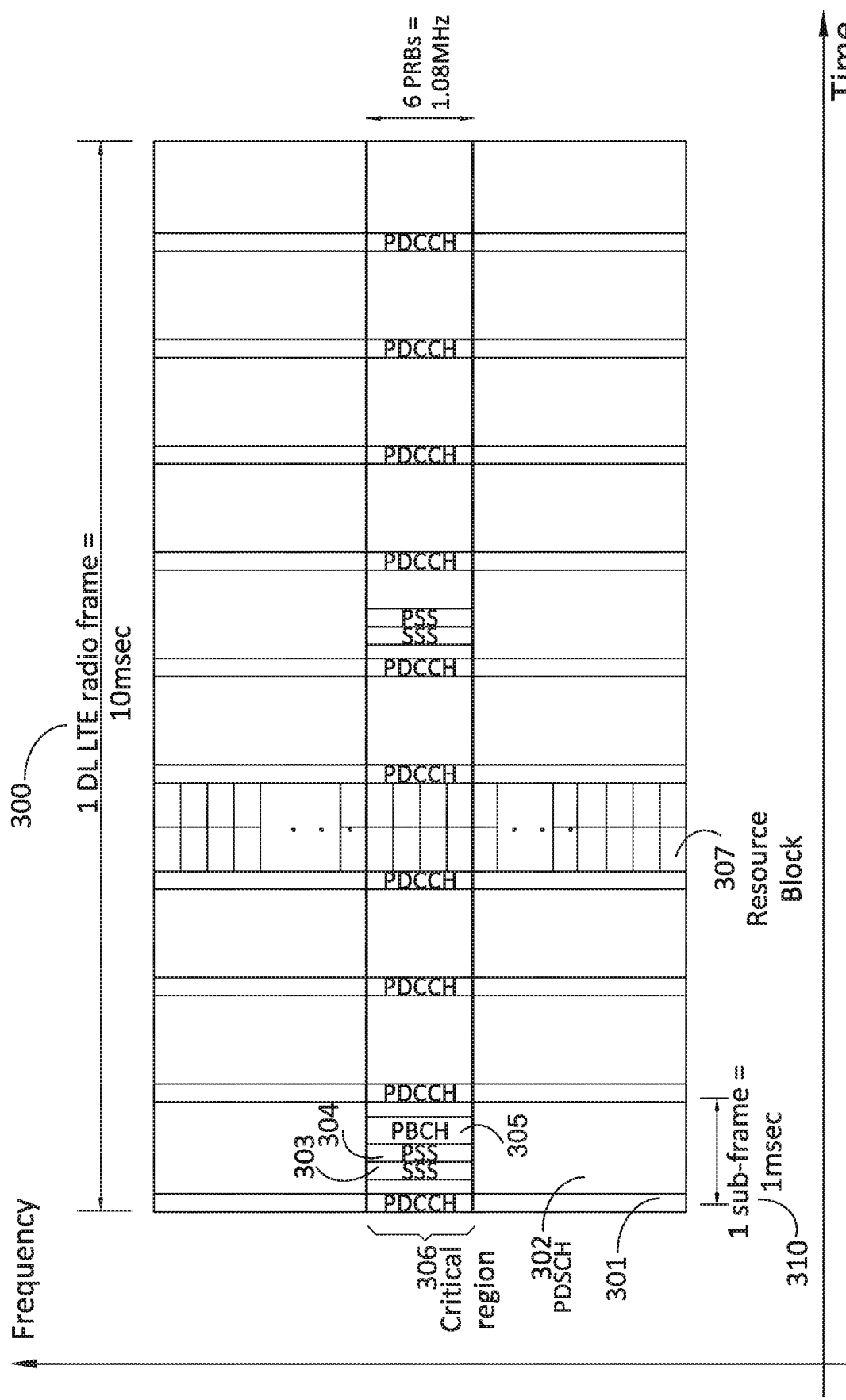
FIG. 3 depicts LTE FDD radio frame (either downlink or uplink) implementing add-on auxiliary signal according to embodiments of the invention.

FIG. 3 depicts an LTE FDD downlink radio frame (but the embodiments herein may also be implemented similarly also for uplink radio frame) implementing auxiliary signal according to embodiments of the invention. The embodiment of FIG. 3 illustrates an LTE radio downlink (DL) frame 300 which has a duration of, say, 10 msec, in an LTE cellular communication system. Frame 300 typically comprises a plurality of LTE physical resource blocks (PRBs) 307 which may for example be a subset of 6 OFDMA symbols in time and 12 sub-carriers in frequency. The DL (downlink) frame also comprises LTE sub-frames such as but not limited to that shown at reference numeral 310 (its duration is, say, 1 msec). The LTE DL (downlink) frame in the illustrated embodiment, is of the FDD (Frequency Division Duplex) type, however TDD (Time Division Duplex) type of DL (downlink) frames may be employed similarly.

As shown, the LTE DL (downlink) frame includes several physical channels or signals e.g. some or all of: Physical DL (downlink) Control Channel (PDCCH) 301, Physical DL (downlink) Shared Channel (PDSCH) 302, Secondary Synchronization Signal (SSS) 303, Primary Synchronization Signal (PSS) 304 and Physical Broadcast Channel (PBCH) 305. Each of these channels or signals or any subset thereof may be deemed critical to LTE system operation.

Since LTE FDD is OFDMA, then the locations for the auxiliary signal in the frame that were described above regarding FIG. 2 may also be used in the LTE FDD system.

A further embodiment of the present invention includes an LTE TDD radio frame implementing add-on auxiliary signal. Since LTE TDD is OFDMA, then all the locations for the auxiliary signal in the frame that were described above regarding OFDMA TDD may also be used in the LTE TDD system.

Figure 4:
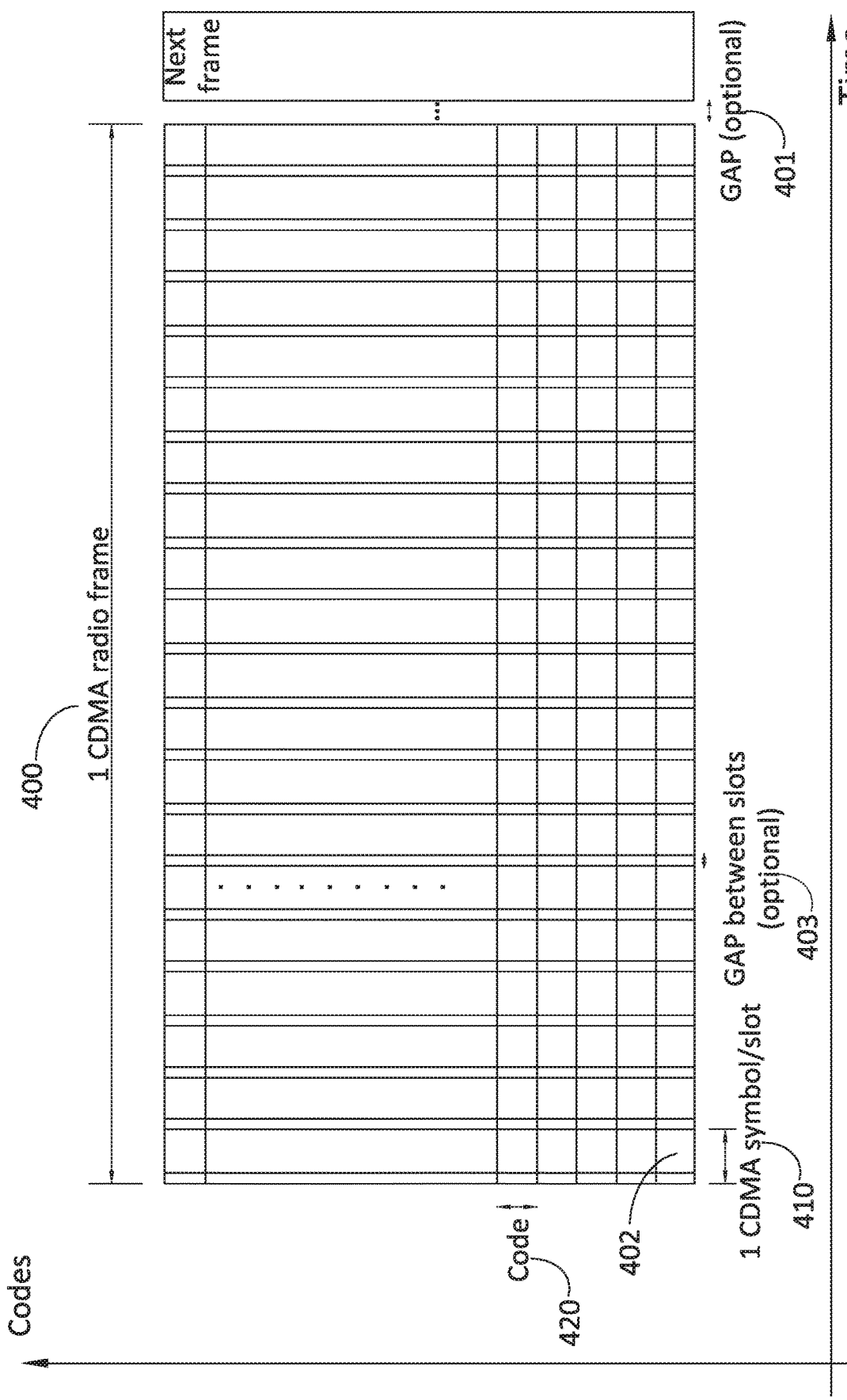
FIG. 4 depicts a CDMA FDD radio frame (either downlink or uplink), in a CDMA communication system implementing add-on auxiliary signal according to certain embodiments of the invention.

FIG. 4 depicts a CDMA FDD radio frame (either downlink or uplink), in a CDMA communication system implementing auxiliary signal according to certain embodiments of the invention. In the CDMA frame 400 there are several locations (in the time domain) that the auxiliary signal may be inserted/transmitted. Each of these locations typically implements auxiliary signal appearance rates. For example, the auxiliary signal may be inserted/transmitted during the gap between slots/symbols 403 of a CDMA symbol/slot 410. The auxiliary signal may be inserted/transmitted every symbol/slot or every several symbols/slots. Alternatively, the auxiliary signal may be inserted/transmitted during un-important symbol/slot duration (or during empty symbol/slot—a symbol/slot time that no data is transmitted). Alternatively the auxiliary signal may be inserted/transmitted during the time gap 401 between consecutive frames. Each of the above examples may be regarded as a "non-important signal" of the transmission, in that improper reception of these signals is not as harmful to the receiver as other (critical/important) signals.

Another embodiment of the present invention includes a CDMA TDD radio frame in a CDMA communication system implementing auxiliary signal according to certain embodiments of the invention. In the TDD system, both DL (downlink) and UL (uplink) frames occupy the same frequency (center frequency) and are transmitted alternately. Between each one of these two frames there are typically guard gaps (e.g. between DL and UL, and/or between UL and DL). In each one, typically, of these guard gaps the auxiliary signal may be implemented. In this implementation, the rate of the auxiliary signal appearance is therefore typically the frames' shift rate. All the locations in the frame that were described in FIG. 4 may also be used in the TDD system.

Figure 5:
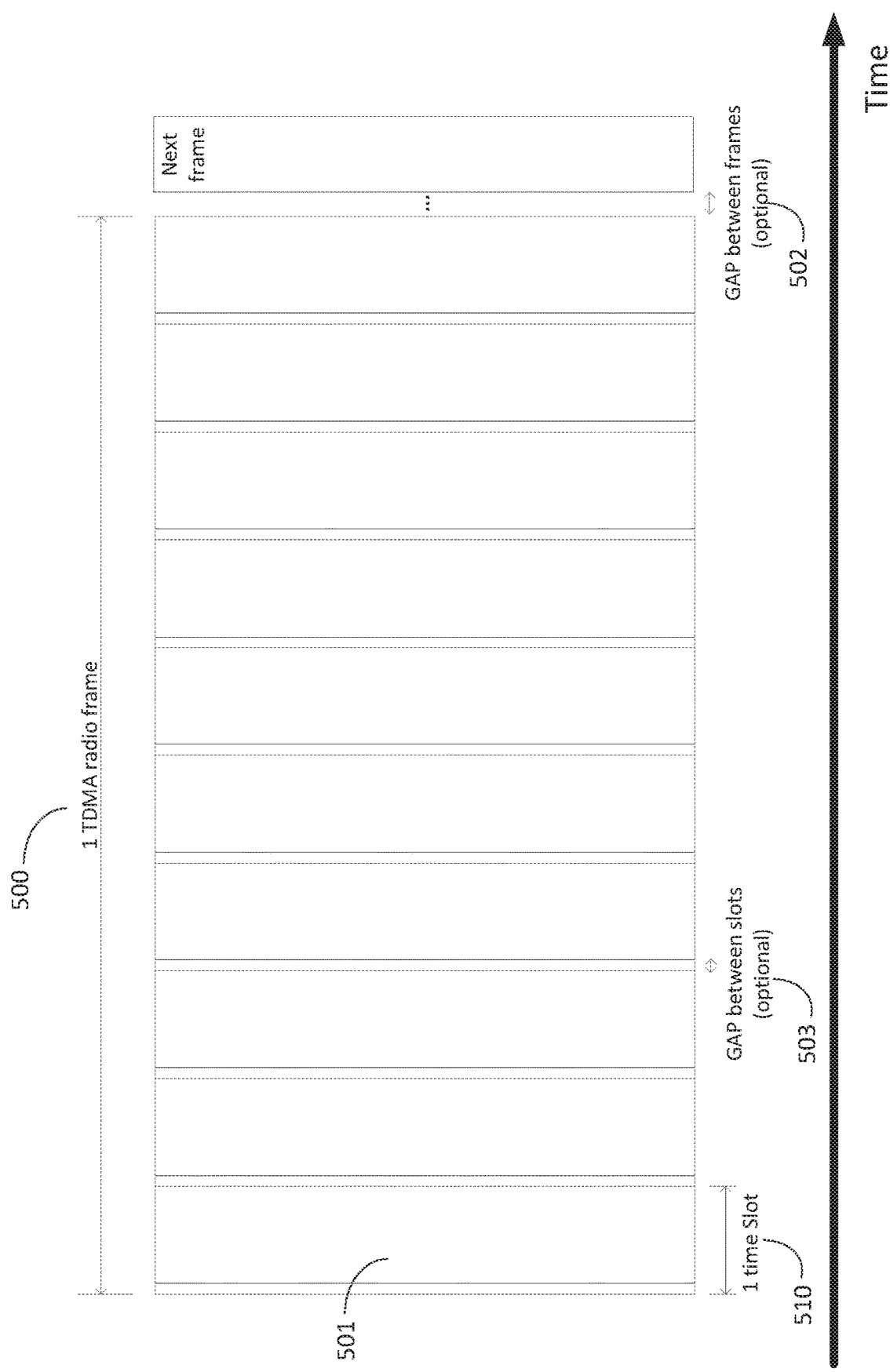
FIG. 5 depicts a TDMA radio frame, in a TDMA communication system implementing add-on auxiliary signal according to certain embodiments of the invention.

FIG. 5 depicts a TDMA radio frame, in a TDMA communication system implementing auxiliary signal according to certain embodiments of the invention. In the TDMA frame 500 there are several locations (in the time domain) that the auxiliary signal may be inserted/transmitted. Each of these locations typically implements different auxiliary signal appearancerates. For example, the auxiliary signal may be inserted/transmitted during the gap between slots 503 of a TDMA symbol 510. The auxiliary signal may be inserted/transmitted every slot or every several slots. Alternatively, the auxiliary signal may be inserted/transmitted during un-important slot duration (or during empty slot—a slot time that no data is transmitted). Alternatively, the auxiliary signal may be inserted/transmitted during the time gap 501 between consecutive frames. Each of the above examples may be regarded as a "non-important signal" of the transmission, in that improper reception of these signals is not as harmful to the receiver as other (critical/important) signals.

FIGS. 14, 14*b*, 14*c*, 16, 18 depicts a more detailed block diagram of an examples of the Auxiliary Signal Transmitter (AST) component of the auxiliary signal apparatus comprising an auxiliary Signal generator, according to further embodiments of the present invention. In this embodiments, Auxiliary Signal Transmitter (AST) 620 comprises a Important Signal detector 840, an Auxiliary Signal Generator 14830, and optionally auxiliary signal manipulator frequencies selector 18860/14831/16831/18831. In the case of an OFDM communication protocol, important signal detector 840 may include OFDM Important Signal Detector, operative to detect predetermined portions of the OFDM signal. Alternatively, in the case of a CDMA communication protocol, important signalImportant Signal Detector 840 may include CDMA Important Signal Detector, operative to detect predetermined portions of the CDMA signal. Alternatively, according to the communication protocol and the important signal characteristics, important signalImportant Signal Detector 840 is operative to detect and receive the important signal or the important signal information as defined above.

In FIG. 18, typically the important signalImportant Signal Detector 840 is operative to detect and/or receive predetermined portions (e.g. Important Signal) of the relevant communication protocol signal, in example as described above regarding FIGS. 2-6*a*. Typically, upon detection of said predetermined portion, the important signalImportant Signal Detector 840 may synchronizes the Auxiliary Signal Frequency Converter 62018831 to perform a change in the alternative center frequency, e.g. to perform a change in the active frequency shift of the auxiliary signal. Auxiliary Signal Frequency Converter 62018831 is the actual component that performs the frequency conversion. The new alternative center frequency may optionally be determined by a frequencies selector 18860. Further optionally, a controller 870 resides in Auxiliary Signal Transmitter (AST) 620, for controlling the operation of its process. Optionally, the change in the alternative center frequency is made upon several consecutive detections of said predetermined portion. Further optionally, the change in the alternative center frequency is determined by some predefined criteria taking into account the detection of said predetermined portion.

Optionally, some predetermined portions of the signal, in which the frequency conversion/shift may be implemented or the auxiliary signal may be inserted, are "non-important signals" of the transmission, in that improper reception of these portions/regions is not as harmful to the receiver as other (critical/important) signals. Some examples of such portions/regions are described above regarding FIGS. 2-5, and also hereinbelow.

Some examples of the operation of the Important Signal Detector 840 are:

a. In the case of a OFDM or OFDMA communication protocol, the Important Signal Detector 840 may be operative to detect the Cyclic Prefix (CP) of the OFDM/OFDMA symbols, and to synchronize the Auxiliary Signal Transmitter 620 to perform a change in the alternative center frequency during the transmission of the CP.

b. In the case of a frame-based communication protocol, where a GAP or some guard period is placed between successive frames, the Important Signal Detector 840 may be operative to detect said GAP or guard period, and to synchronize the Auxiliary Signal Transmitter 620 to perform a change in the alternative center frequency during said GAP or guard period.

c. In the case of a TDD communication protocol, where a GAP or some guard period is placed between the uplink subframe and the downlink subframe, the Important Signal Detector 840 may be operative to detect said GAP or guard period, and to synchronize the Auxiliary Signal Transmitter 620 to perform a change in the alternative center frequency during said GAP or guard period.

d. In the case of a frame-based communication protocol, where an empty region (e.g. empty symbol as described above) is placed within the frames, the Important Signal Detector 840 may be operative to detect the empty region, and to synchronize the Auxiliary Signal Transmitter 620 to perform a change in the alternative center frequency during the empty region.

e. In the case of a frame-based communication protocol, where a preamble or other known signal is placed within the frame, the Important Signal Detector 840 may be operative to detect the preamble or other known signal, and to synchronize the Auxiliary Signal Transmitter 620 to perform a change in the alternative center frequency during non-important signals (e.g. un-important symbol duration as described above).

In one embodiment of the present invention, an additional auxiliary signal is transmitted by Auxiliary Signal Transmitter (AST) 620 to be received by Auxiliary Signal Receiver (ASR) 640, e.g. to help Auxiliary Signal Transmitter (AST) 620 and Auxiliary Signal Receiver (ASR) 640 to better coordinate their operation, e.g. as described below. This signal, or any similar signal which facilitates coordination of such operations, may be termed a "additional Auxiliary Signal" signal.

Typically, Auxiliary Signal Transmitter (AST) 620 comprises an auxiliary Signal generator 14830, which generates the Auxiliary signal. Alternatively or in addition, the Auxiliary signal may be generated by an external source.

Optionally this Auxiliary signal may be predetermined or may vary over time, or have a portion which varies, and another portion which is predetermined.

Typically, the Auxiliary signal is transmitted at a second alternative center frequency. The transmission of the auxiliary signal is in addition to the transmission of the original signal of the communication protocol at the first alternative center frequency. First and second alternative frequencies may be the same frequencies, and may be different frequencies.

Typically, the Auxiliary signal may be used by the Auxiliary Signal Receiver (ASR) to achieve e.g. some or all of the following example objectives:

1. This Auxiliary signal may be used for better frequency estimation and synchronization of the ASR 640 or/and the receiver 020.
2. This Auxiliary signal may be used for better timing estimation and synchronization of the ASR 640 or/and the receiver 020.
3. This Auxiliary signal may be used for better channel or gain estimation of the ASR 640 or/and the receiver 020.
4. This Auxiliary Signal may be used for delivering control data between the network nodes (e.g. between the Auxiliary Signal Transmitter (AST) and the Auxiliary Signal Receiver (ASR) or/and between the transmitter 010 and the receiver 020). Such control data is, for example, the next frequency shift of the original signal and/or the Auxiliary signal (or the next frequency shifts list) that will be executed by the Auxiliary Signal Transmitter (AST). Another example of such control data is the location within the frame that the frequency shift will occur (examples of such locations/portions are described above with regard to FIGS. 2-5). Additional information may include other auxiliary signal information as defined/described above.

The Auxiliary Signal Generator 14830 may optionally interface 829 the Important Signal Detector 840 such that relevant inputs from the Important Signal Detector 840 can be provided to the Auxiliary Signal Generator 14830. These inputs and information may for example comprise the inputs described in the examples of the operation of the Important Signal Detector 840 above (such as but not limited to the inputs from the Important Signal Detector 840 to the Auxiliary Signal Transmitter 620).

After generating the base-band Auxiliary signal at the Auxiliary Signal Generator 14830, the Auxiliary signal may be manipulated by the Auxiliary Signal Manipulator 14831/16831/18831 18831.

In case that the manipulator in frequency converter, such as in FIG. 18, the new Auxiliary Signal center frequency may optionally be determined by a frequencies selector 18860. Further optionally, a controller 870 resides in Auxiliary Signal Transmitter (AST) 620, for controlling the operation of its process. Optionally, the change in the alternative Auxiliary Signal center frequency is made upon several consecutive detections of said predetermined portion. Further optionally, the change in the alternative Auxiliary Signal center frequency is determined by some predefined criteria taking into account the detection of said predetermined portion.

Optionally, the center frequency can be fixed over a period time. Further optionally, the frequency shift of the Auxiliary Signal Transmitter 620 and the Auxiliary Signal Frequency Converter 18831 are the same (the same frequency that, e.g. the Frequencies Selector provides these two converters at a certain time).

Optionally, said auxiliary signal may be a Continuous Wave (CW), a signal frequency tone, a multiple of tones, or any other predetermined signal. Further optionally, the auxiliary signal may be transmitted periodically.

Alternatively, the auxiliary signal may be a modulated signal, carrying information. Such information may be, for example, the current first alternative center frequency, the first alternative center frequency for the next change, the second alternative center frequency for the next change, etc.

FIG. 19 depicts a more detailed block diagram of an example of the Auxiliary Signal Receiver (ASR) component of the auxiliary signal apparatus comprising an auxiliary Signal receiver, according to a further embodiment of the present invention. In this embodiment, Auxiliary Signal Receiver (ASR) 640 comprises a Important Signal Detector 17910, an Auxiliary Signal Receiver 15940, and optionally a frequencies selector 19990. In the case of an OFDM communication protocol, Important Signal Detector 17910 comprises an OFDM synchronization detector, operative to detect predetermined portions of the OFDM signal. Alternatively, in the case of a CDMA communication protocol. Important Signal Detector 17910 comprises a CDMA synchronization detector, operative to detect predetermined portions of the CDMA signal. Alternatively, according to the communication protocol, Important Signal Detector 17910 is operative to detect and receive predetermined portions of the relevant communication protocol signal.

Typically, Important Signal Detector 17910 is operative to detect predetermined portions of the relevant communication protocol signal in which the frequency conversion/shift may be realized, as described above regarding FIGS. 2-6a. Typically, upon detection of said predetermined portion, the Important Signal Detector 17910 synchronizes the Auxiliary Signal Receiver 15940 to perform a change in the alternative center frequency, e.g. to perform a change in the active frequency shift. Auxiliary Signal Frequency Converter 19930 is the actual component that performs the frequency conversion. The new alternative center frequency may optionally be determined by a frequencies selector 19990. Further optionally, a controller 970 resides in Auxiliary Signal Receiver (ASR) 640, for controlling the operation of its process. Optionally, the change in the alternative center frequency is made upon several consecutive detections of said predetermined portion. Further optionally, the change in the alternative center frequency is determined by some predefined criteria taking into account the detection of said predetermined portion.

Optionally, Important Signal Detector 17910 may use the received signal 635 (e.g. the signal which is received at the alternative center frequency) for the purpose of detection and synchronization. Optionally, Important Signal Detector

17910 may use the signal 650 (e.g. the signal which has the original center frequency) for the purpose of detection and synchronization. Further optionally, Important Signal Detector 17910 may use both signals, 635 and 650.

Optionally, said predetermined portions of the signal, in which the frequency conversion/shift may be realized, are "non-important signals" of the transmission, in that improper reception of these portions/regions is not as harmful to the receiver as other (critical) signals. Some examples of such portions/regions are described above regarding FIGS. 2-5, and also herein below.

Some examples of the operation of the Important Signal Detector 840 are:

a. In the case of a OFDM or OFDMA communication protocol, the Important Signal Detector 17910 may be operative to detect the Cyclic Prefix (CP) of the OFDM/OFDMA symbols, and to synchronize the Auxiliary Signal Receiver 15940, e.g. to perform a change in the alternative center frequency during the reception of the CP.

b. In the case of a frame-based communication protocol, where a GAP or some guard period is placed between successive frames, the Important Signal Detector 17910 may be operative to detect said GAP or guard period, and to synchronize the Auxiliary Signal Receiver 15940 to perform a change in the alternative center frequency during said GAP or guard period.

c. In the case of a TDD communication protocol, where a GAP or some guard period is placed between the uplink subframe and the downlink subframe (or vice versa), the Important Signal Detector 17910 may be operative to detect said GAP or guard period, and to synchronize the Auxiliary Signal Receiver 15940 to perform a change in the alternative center frequency during said GAP or guard period.

d. In the case of a frame-based communication protocol, where an empty region (e.g. empty symbol as described above) is placed within the frames, the Important Signal Detector 17910 may be operative to detect said empty region, and to synchronize the Auxiliary Signal Receiver 15940 to perform a change in the alternative center frequency during said empty region.

e. In the case of a frame-based communication protocol, where a preamble or other known signal is placed within the frame, the Important Signal Detector 17910 may be operative to detect the preamble or other known signal, and to synchronize the Auxiliary Signal Receiver 15940 to perform a change in the alternative center frequency during non-important signals (e.g. un-important symbol duration as described above).

Figure 8:
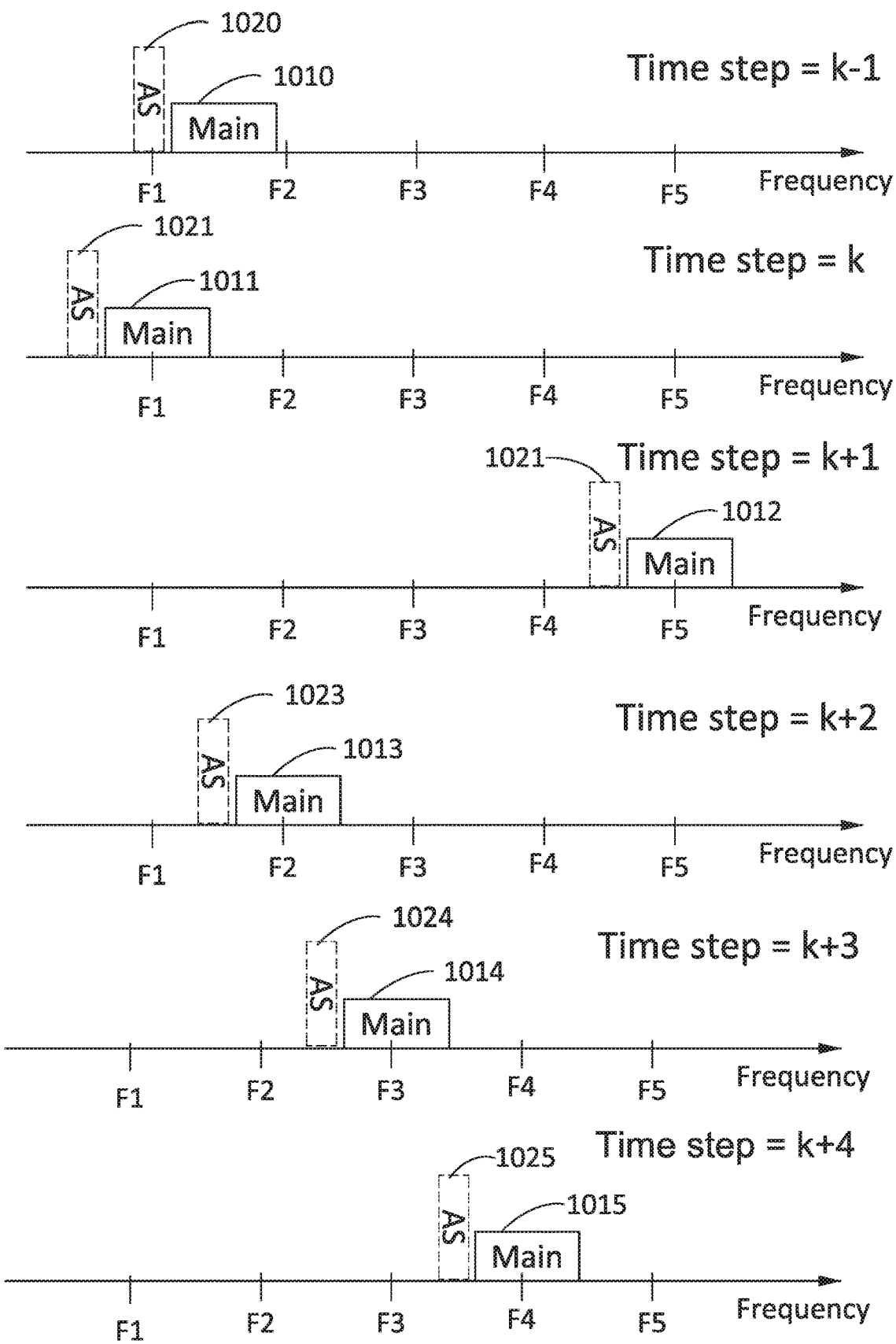
FIG. 8 is an illustration of the spectrum usage and allocation, as being changed along the time progress, with an auxiliary signal allocated according to a first embodiment of the present invention.

FIG. 8 is an illustration of the spectrum usage and allocation, as being changed along the time progress, with an auxiliary signal (AS) allocated according to a first embodiment of the present invention.

Figure 9:
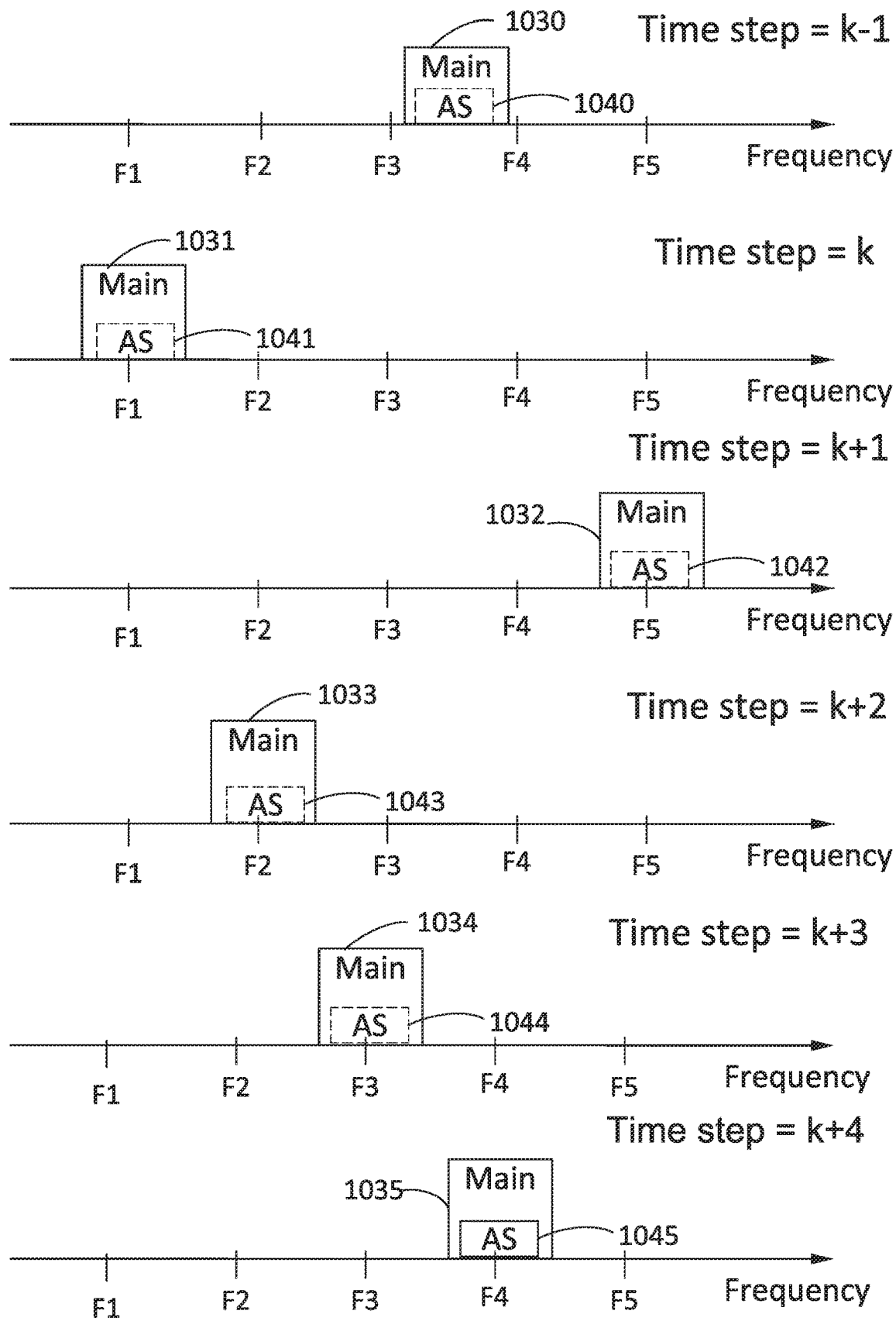
FIG. 9 is an illustration of the spectrum usage and allocation, as being changed along the time progress, with an auxiliary signal allocated according to a second embodiment of the present invention.

FIG. 9 is an illustration of the spectrum usage and allocation, as being changed along the time progress, with an auxiliary signal allocated according to a second embodiment of the present invention.

Figure 11:
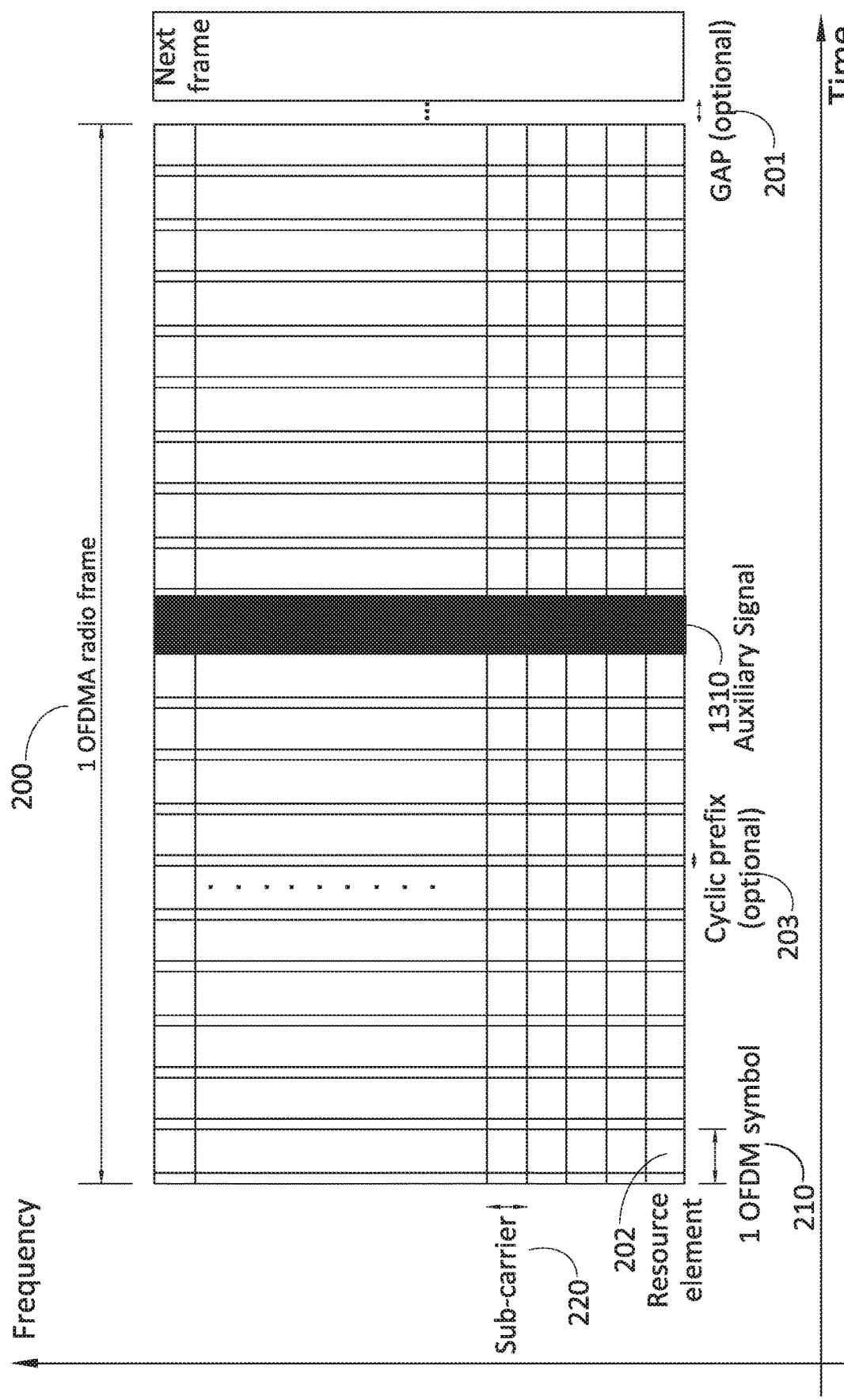
FIG. 11 is an illustration of an auxiliary signal allocation according to a third embodiment of the present invention.

FIG. 11 is an illustration of an auxiliary signal allocation according to a third embodiment of the present invention.

Figure 12:
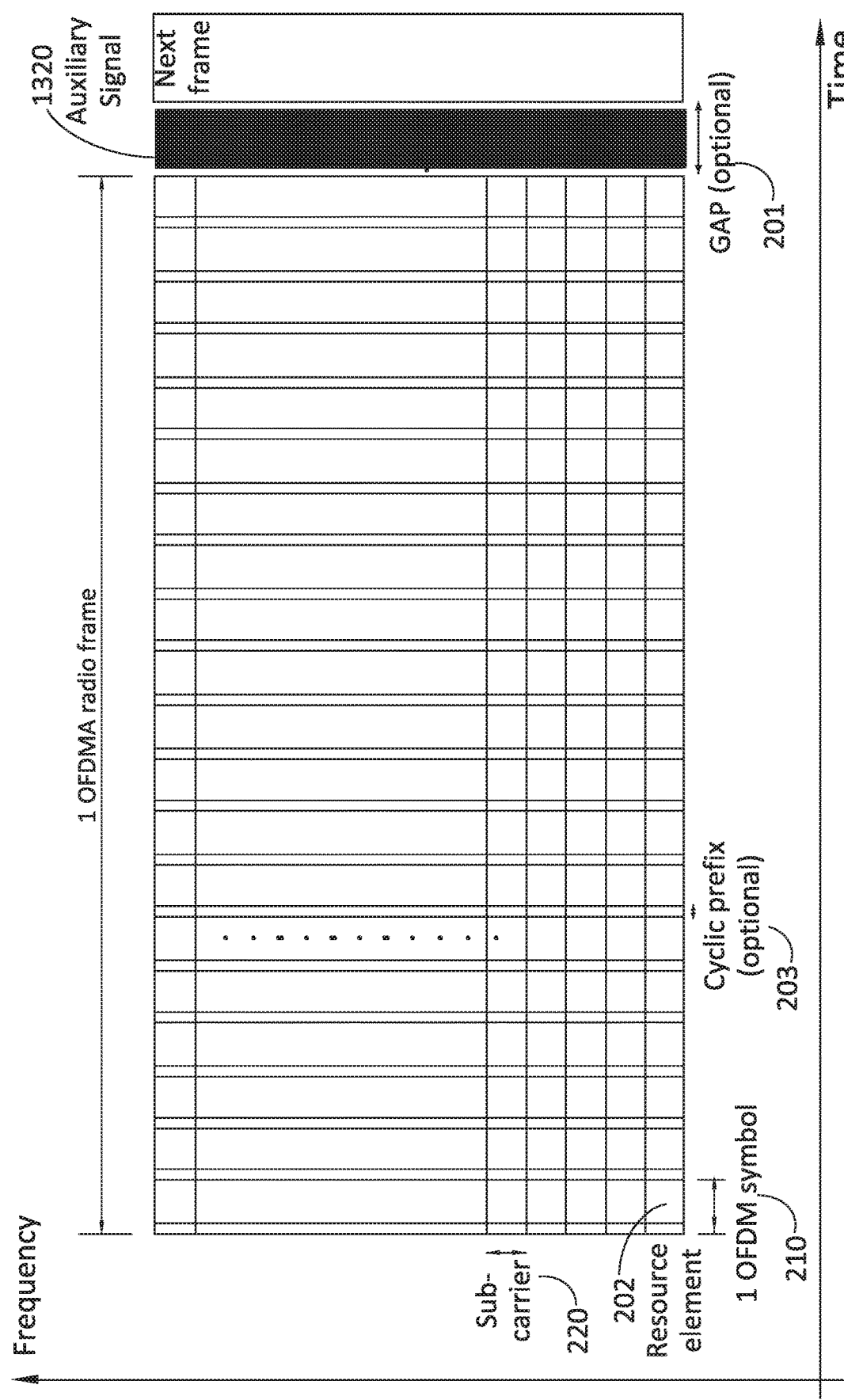
FIG. 12 is an illustration of an auxiliary signal allocation according to a fourth embodiment of the present invention.

FIG. 12 is an illustration of an auxiliary signal allocation according to a fourth embodiment of the present invention.

Figure 13:
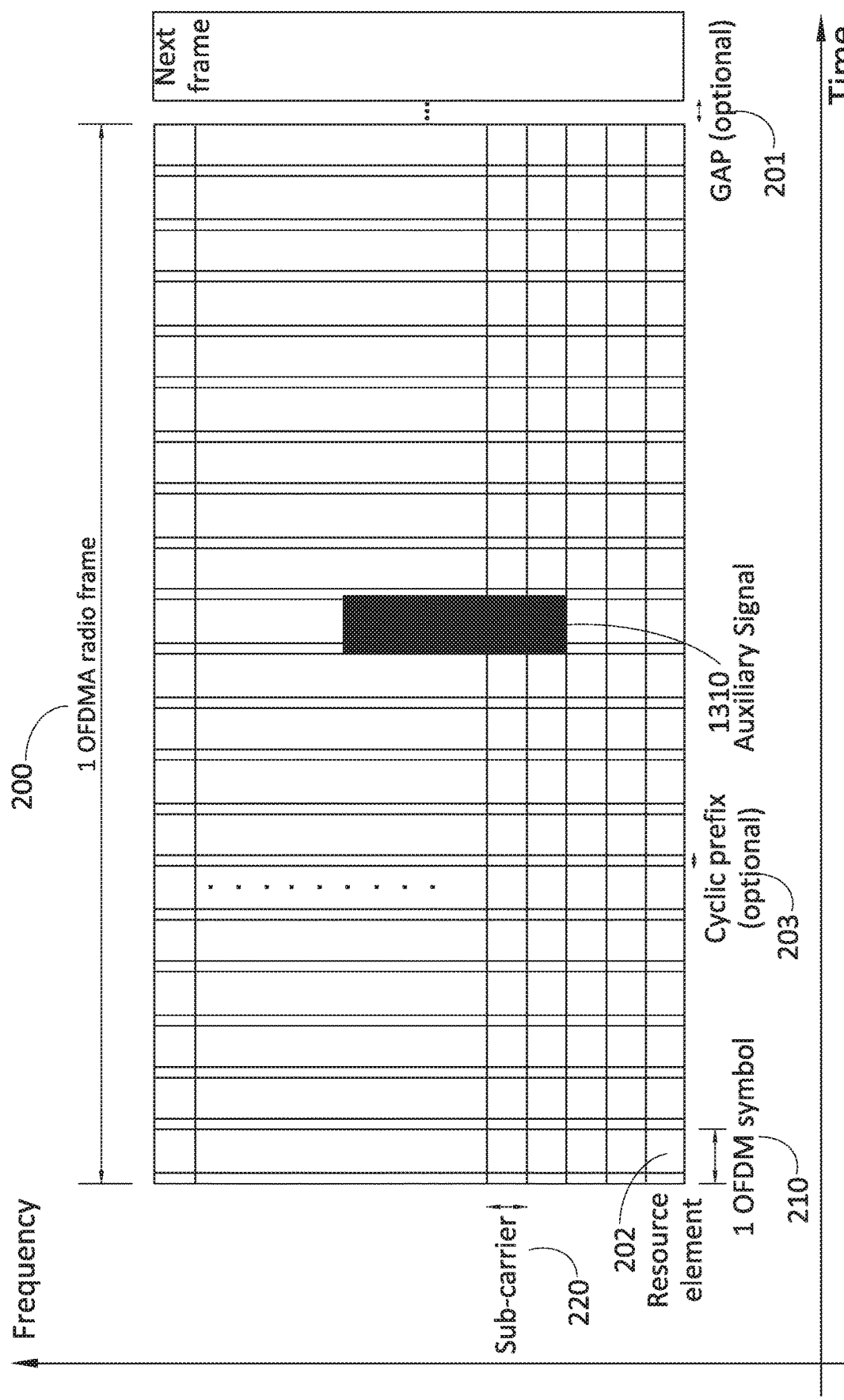
FIG. 13 is an illustration of an auxiliary signal allocation according to a fifth embodiment of the present invention.

FIG. 13 is an illustration of an auxiliary signal allocation according to a fifth embodiment of the present invention.

FIG. 8 is an illustration of an example of the spectrum usage and allocation, as being changed along the time progress, with an auxiliary signal (AS) allocated according to an embodiment of the present invention. In this example the Auxiliary Signal covers different frequency allocations than the main (=original) signal. This example shows a constant offset of the center frequency of the Auxiliary Signal with respect to the center frequency of the main signal. It can be seen that the Auxiliary Signal and the main signal have the same frequency shifts over time. Optionally, this behavior can be cyclic (if there is a fixed list of frequency shifts of the main signal, and it is executed in a cyclic order, meaning implementing the frequency shift in a sequential order and that after executing the last frequency shift in the list, the next frequency shift is again the first frequency shift in the list). Optionally, the behavior can be non-cyclic (no cyclic order of frequency shifts) and may be determined according a predetermined algorithm. Optionally the frequency shifts enable orthogonal coverage of bandwidths of the main or Auxiliary signals, meaning e.g. that there is no overlap of frequencies (bandwidth wise) between all the bandwidths of the main signal and/or the Auxiliary Signal along the different frequency shifts (as can be seen at time steps "k" to time step "k+4"). Optionally the frequency shifts enable non-orthogonal coverage of bandwidths of the main or Auxiliary signals (as can be seen at time steps "k−1" with respect to time steps "k" and to time step "k+2" because e.g. main signal 1010 at time step "k−1" covers part of the same frequencies as main signal 1011 of time step "k" and main signal 1013 of time step "k+2". Further optionally, the frequency shifts enable a combination of the two frequency shift schemes over time (orthogonal and non-orthogonal). There may be non-constant frequency offset between the Auxiliary signal and the main signal, in other embodiments of present invention.

FIG. 9 is an illustration of an example of the spectrum usage and allocation, as it changes over time, with an auxiliary signal allocated according to an embodiment of the present invention. In this example the Auxiliary Signal covers part of the frequency allocation of the main signal. This example shows the same center frequency or a constant offset of the center frequency of the Auxiliary Signal with respect to the center frequency of the main signal. It can be seen that the Auxiliary Signal and the main signal have the same frequency shifts over time (optionally they may have different frequency shifts). Optionally this behavior can be cyclic (if there is a fixed list of frequency shifts of the main signal, and it is executed in a cyclic order, meaning implementing the frequency shift in a sequential order, and that after executing the last frequency shift in the list, the next frequency shift is again the first frequency shift in the list). Optionally, the behavior can be non-cyclic (no cyclic order of frequency shifts) and may be determined according a predetermined algorithm. Optionally, the frequency shifts enable orthogonal coverage of bandwidths of the main or Auxiliary signals, meaning e.g. that there is no overlap of frequencies (bandwidth wise) between all the bandwidths of the main signal and/or the Auxiliary Signal along the different frequency shifts (as can be seen at time steps "k" to time step "k+4"). Optionally the frequency shifts enable non-orthogonal coverage of bandwidths of the main or Auxiliary signals (as can be seen at time steps "k−1" with respect to time steps "k+3" and to time step "k+4" because e.g. main signal 1030 at time step "k−1" covers the same frequencies as main signal 1034 of time step "k+3" and main signal 1035 of time step "k+4". Further optionally the frequency shifts enable a combination of the two frequency shift schemes over time (orthogonal and non-orthogonal). There may be non-constant frequency offset between the Auxiliary signal and the main signal, in other embodiments of present invention. The AS can optionally be transmitted during the same time periods that the main signal is transmitted, or further optionally, during only a part of the time periods of the main signal (as will be illustrated in FIGS. 11, 12 and 13 hereunder).

Figure 10:
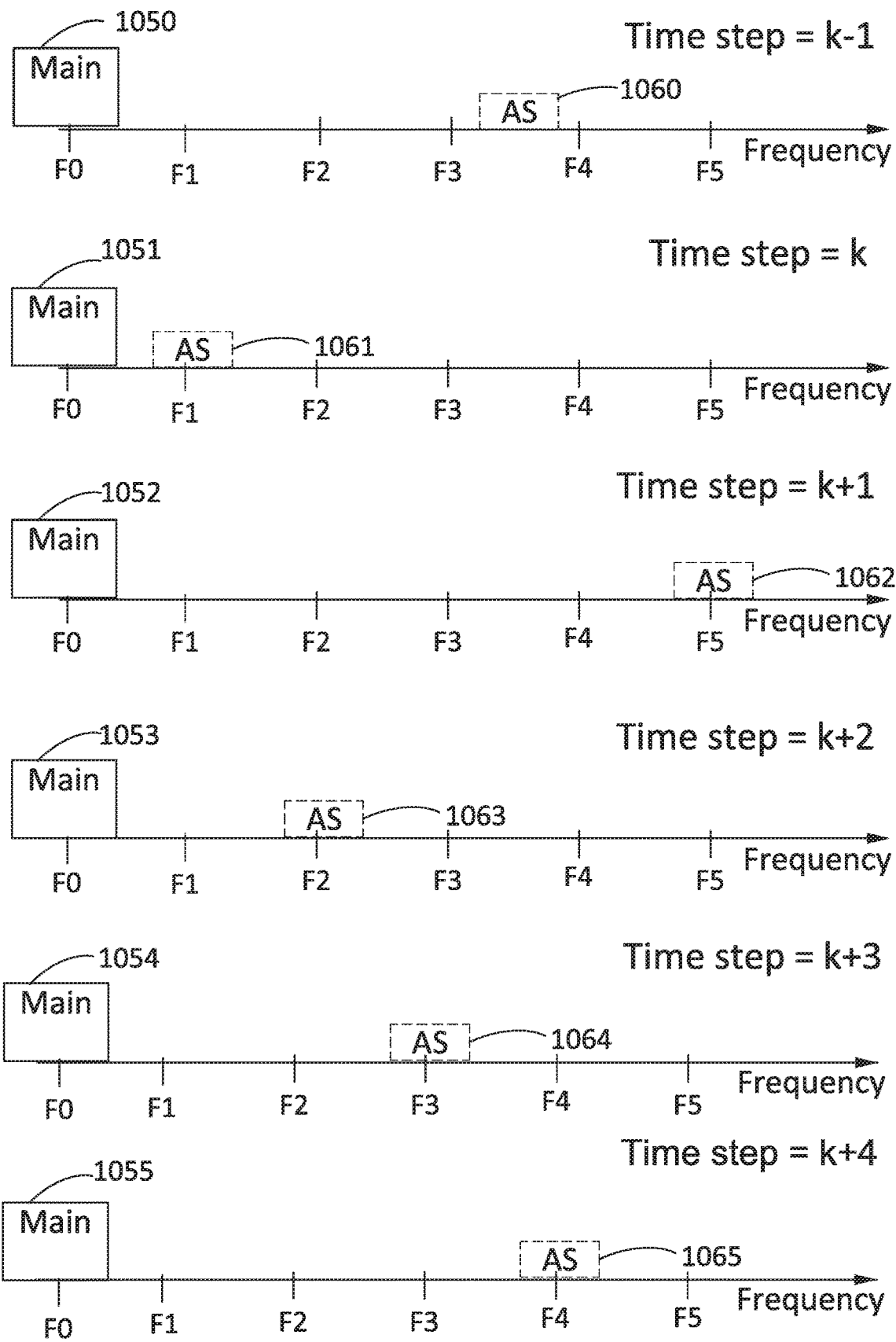
FIG. 10 is an illustration of the spectrum usage and allocation, as being changed along the time progress, with an auxiliary signal allocated according to a second embodiment of the present invention.

FIG. 10 is an illustration of an example of the spectrum usage and allocation, as it changes along time, with an auxiliary signal allocated according to an embodiment of the present invention. In this example the main/original signal is located at a fixed center frequency (1050-1055) whereas the Auxiliary Signal (1060-1065) is located in the frequency domain at different center frequencies along time. It can be seen that the Auxiliary Signal may have different frequency shifts. Optionally this behavior (frequency shifts) can be cyclic (if there is a fixed list of frequency shifts, and it is executed in a cyclic order, meaning implementing the frequency shift in a sequential order, and that after executing the last frequency shift in the list, the next frequency shift is again the first frequency shift in the list). Optionally, the behavior can be non-cyclic (no cyclic order of frequency shifts) and may be determined according a predetermined algorithm. Optionally, the frequency shifts enable orthogonal coverage of bandwidths of the main and/or Auxiliary signals, meaning e.g. that there is no overlap of frequencies (bandwidth wise) between all the bandwidths of the main signal and/or the Auxiliary Signal along the different frequency shifts (as can be seen at time steps "k" to time step "k+4"). Optionally the frequency shifts enable non-orthogonal coverage of bandwidths of the main or Auxiliary signals (as can be seen at time steps "k−1" with respect to time steps "k+3" and to time step "k+4" because e.g. auxiliary signal 1060 at time step "k−1" covers the same frequencies as auxiliary signal 1064 of time step "k+3" and auxiliary signal 1065 of time step "k+4". Further optionally the frequency shifts enable a combination of the two frequency shift schemes over time (orthogonal and non-orthogonal). There may be non-constant frequency offset between the Auxiliary signal and the main signal, in other embodiments of present invention. The AS can optionally be transmitted during the same time periods that the main signal is transmitted, or further optionally, during only a part of the time periods of the main signal.

FIG. 11 is an illustration of an example of an auxiliary signal allocation according to an embodiment of the present invention. In this example, an auxiliary signal 1310 being transmitted at only a portion of the frame duration (time) of an OFDMA frame 200 is proposed (e.g. at a non-important signal such as un-important symbol duration). The Auxiliary signal, in this example, covers all the bandwidth of the frame/communication protocol. The same may be applied to any frame based communication protocol.

FIG. 12 is an illustration of an auxiliary signal allocation according to an embodiment of the present invention. In this example, an auxiliary signal 1320 being transmitted at only a portion of the frame duration (time) of an OFDMA frame 200 is proposed, e.g. at the time GAP between frames. The Auxiliary signal, in this example, covers all the bandwidth of the frame/communication protocol. The same may be applied to any frame based communication protocol.

FIG. 13 is an illustration of an auxiliary signal allocation according to an embodiment of the present invention. In this example, an auxiliary signal 1330 being transmitted at only a portion of the frame duration (time) of an OFDMA frame 200 is proposed (e.g. at a non-important signal such as un-important resource elements). The Auxiliary signal, in this example, covers part of the bandwidth of the frame/communication protocol. The same may be applied to any frame based communication protocol.

FIG. 14 presents detailed block diagram of an AST according to certain embodiments which is suitable e.g. for implementation of the system of FIG. 6a.

FIG. 14b presents detailed block diagram of AST according to certain embodiments which is suitable e.g. for implementation of the system of FIGS. 6b and 6c.

FIG. 14c presents detailed block diagram of AST according to certain embodiments which is suitable e.g. for implementation of the system of FIGS. 6b and 6c to be used for original signal which is according to cellular standard, e.g. the LTE are LTE-advanced standards, wherein the Important Signal Detector is implemented by using cellular (e.g. LTE) modem 849.

FIG. 15a presents detailed block diagram of ASR according to certain embodiments which is suitable e.g. for implementation of the system of FIG. 6a.

Figure 15B:
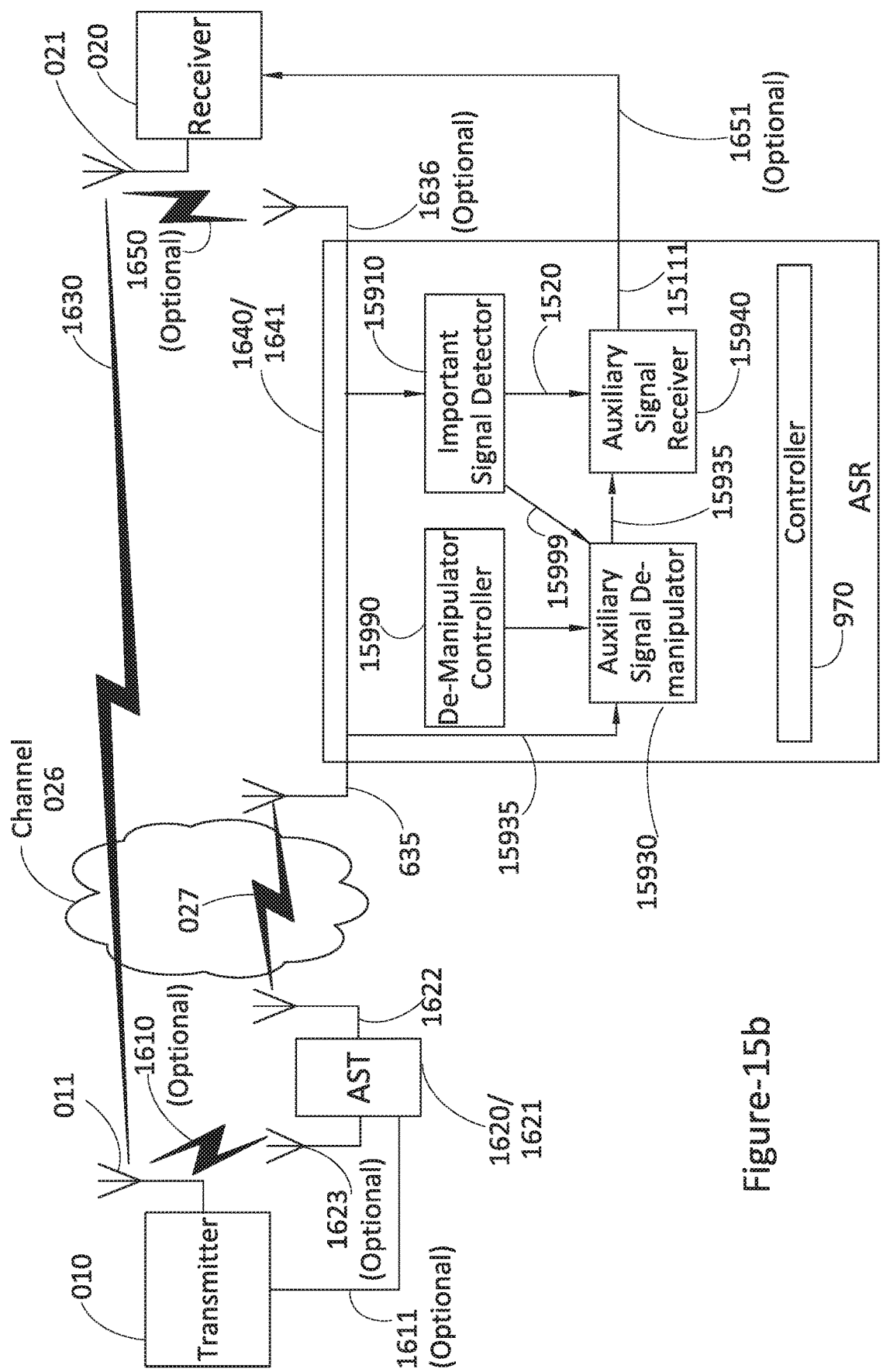

FIG. 15b presents detailed block diagram of ASR according to certain embodiments which is suitable e.g. for implementation of the system of FIGS. 6b and 6c.

Figure 7C:
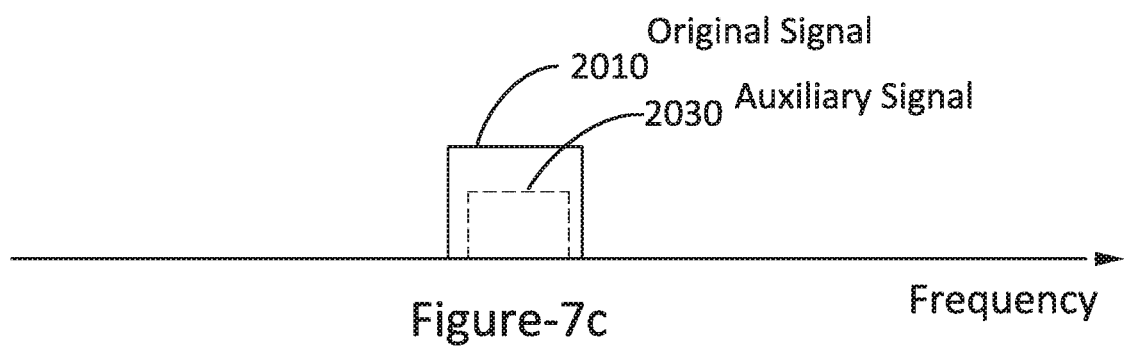
Figure 7D:
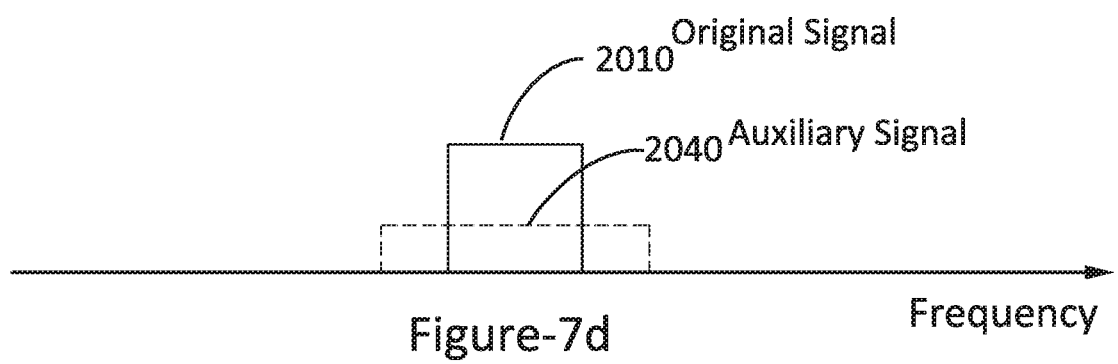
Figure 16:
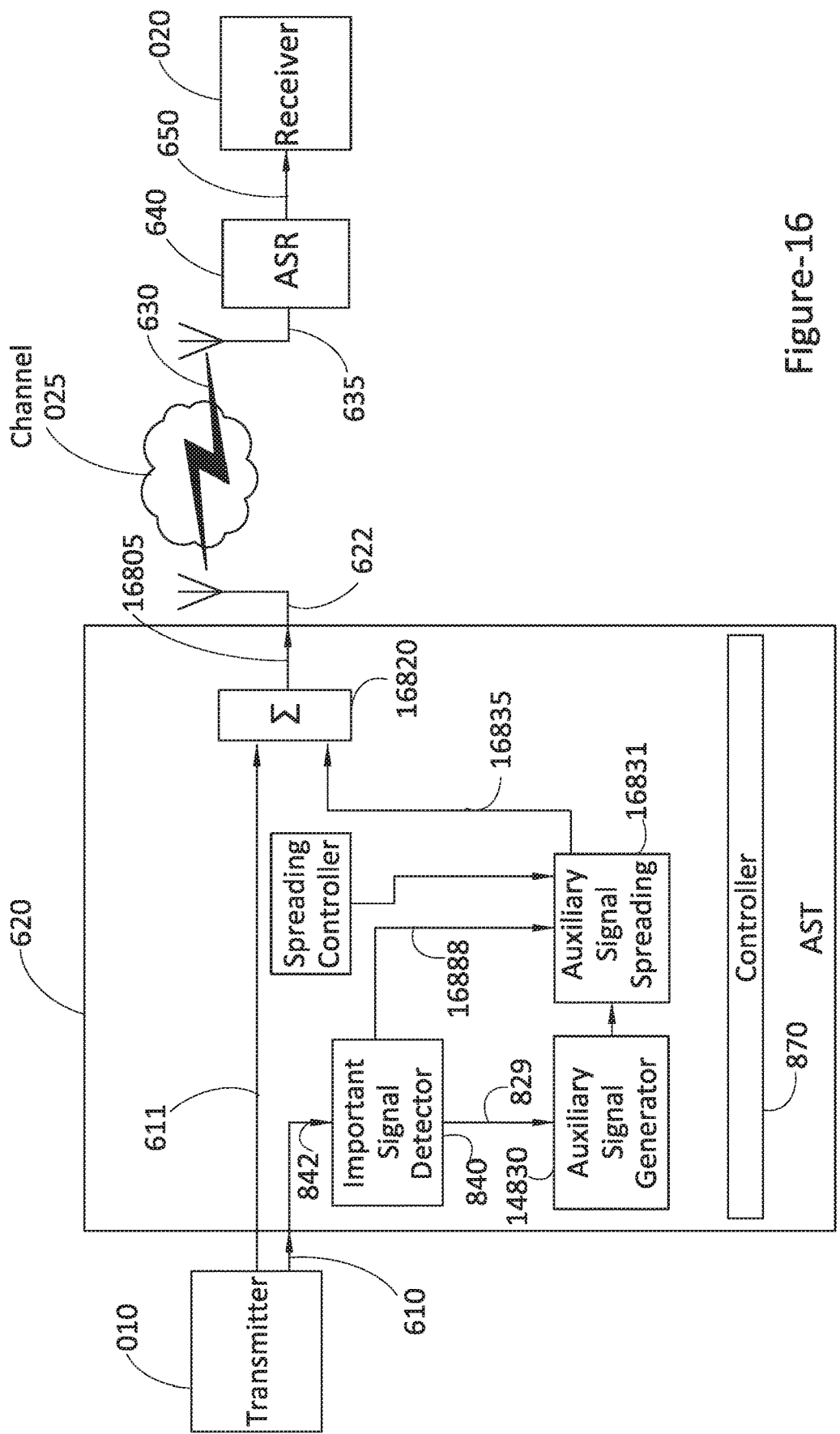
FIGS. 16,17 depicts block diagrams of example of implementation of auxiliary signal transmitter (AST)/Auxiliary Signal Receiver (ASR) with the auxiliary signal manipulator/de-manipulator being spreading/de-spreading (spread spectrum) signal according to an embodiment of the present invention.

FIG. 16 presents detailed block diagram of AST according to certain embodiments which is suitable e.g. for implementation of the system of FIG. 6a whereas the AS manipulator is executing spreading 16831 (e.g. as done in CDMA or other spread spectrum techniques) to the baseband AS. The spreading may occupy the same bandwidth of the original signal, or only a portion of the bandwidth of the original signal or may be non-overlapping with the bandwidth of the original signal. FIGS. 7b, 7c and 7d illustrated the frequency domain presentation of this implementation. In this case the optional block of manipulator controller can be spreading controller that for example determines the spreading codes and/or other characteristics of the spreading.

Figure 17:
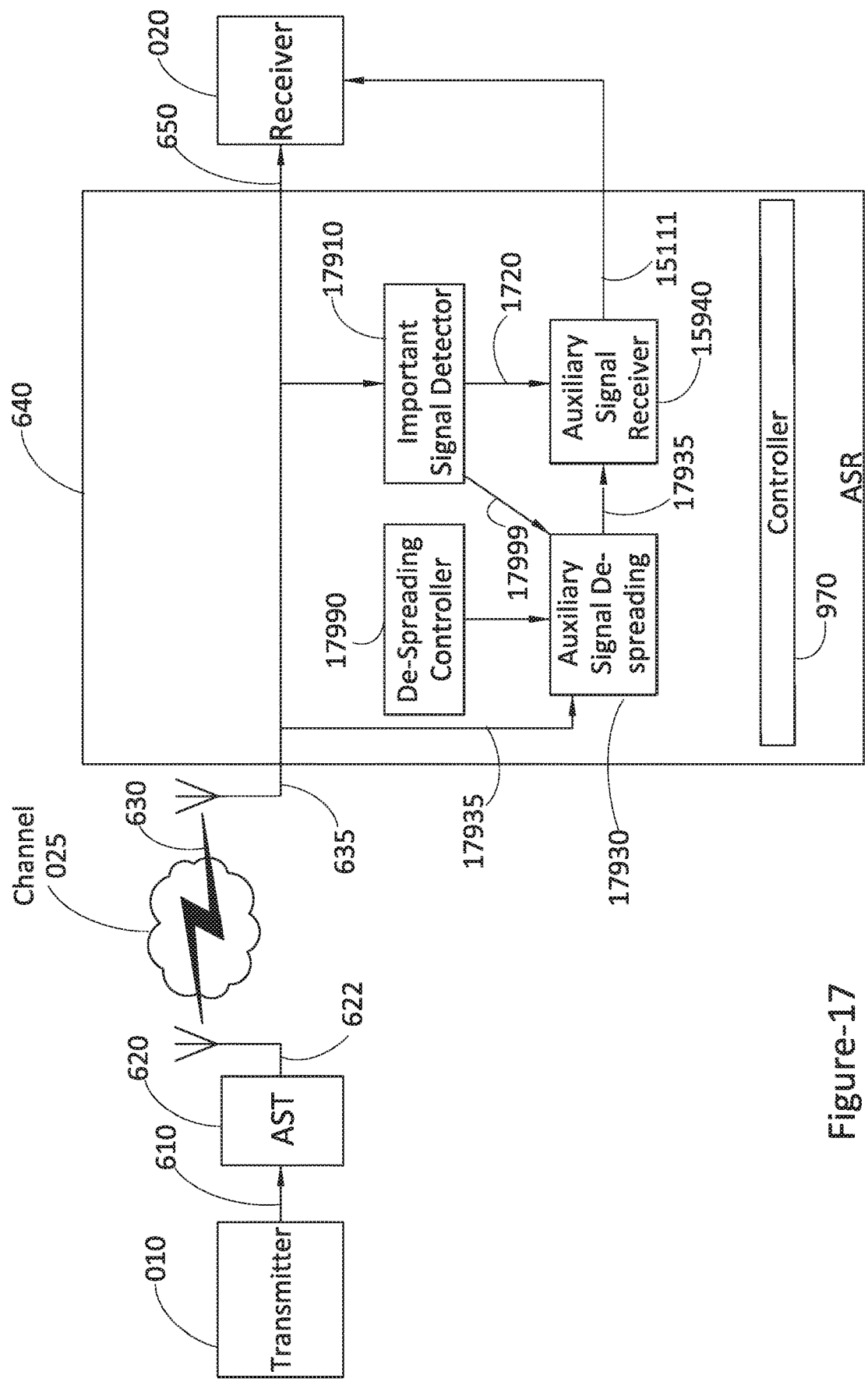

FIG. 17 presents detailed block diagram of ASR according to certain embodiments which is suitable e.g. for implementation of the system of FIG. 6a whereas the AS de-manipulator is executing de-spreading 17930 (e.g. as done in CDMA or other spread spectrum techniques).

Similar implementation of manipulator as if FIGS. 16-17, mutatis mustandis for doing spreading to the AS for AS-apparatus configurations as depicted in FIGS. 6b and 6c are also incorporated as embodiments of present invention.

FIG. 18 presents detailed block diagram of AST according to certain embodiments which is suitable e.g. for implementation of the system of FIG. 6a whereas the AS manipulator is executing frequency conversion 18831 to the baseband/IF/RF of the AS. FIGS. 8, 9, 10, 13 illustrate the frequency domain presentation of this implementation. In this case the optional block of manipulator controller can be frequency selector 18860 that for example determines the frequency shift list, timing of the shift and any other characteristics of the frequency conversion.

FIG. 19 presents a detailed block diagram of an ASR according to certain embodiments which is suitable e.g. for implementation of the system of FIG. 6a whereas the AS de-manipulator is executing frequency conversion 19930.

Similar implementation of manipulator as if FIGS. 18-19 for doing frequency conversion to the AS e,g, for AS-apparatus configurations as depicted in FIGS. 6b and 6c are also incorporated as embodiments of present invention.

Figure 20:
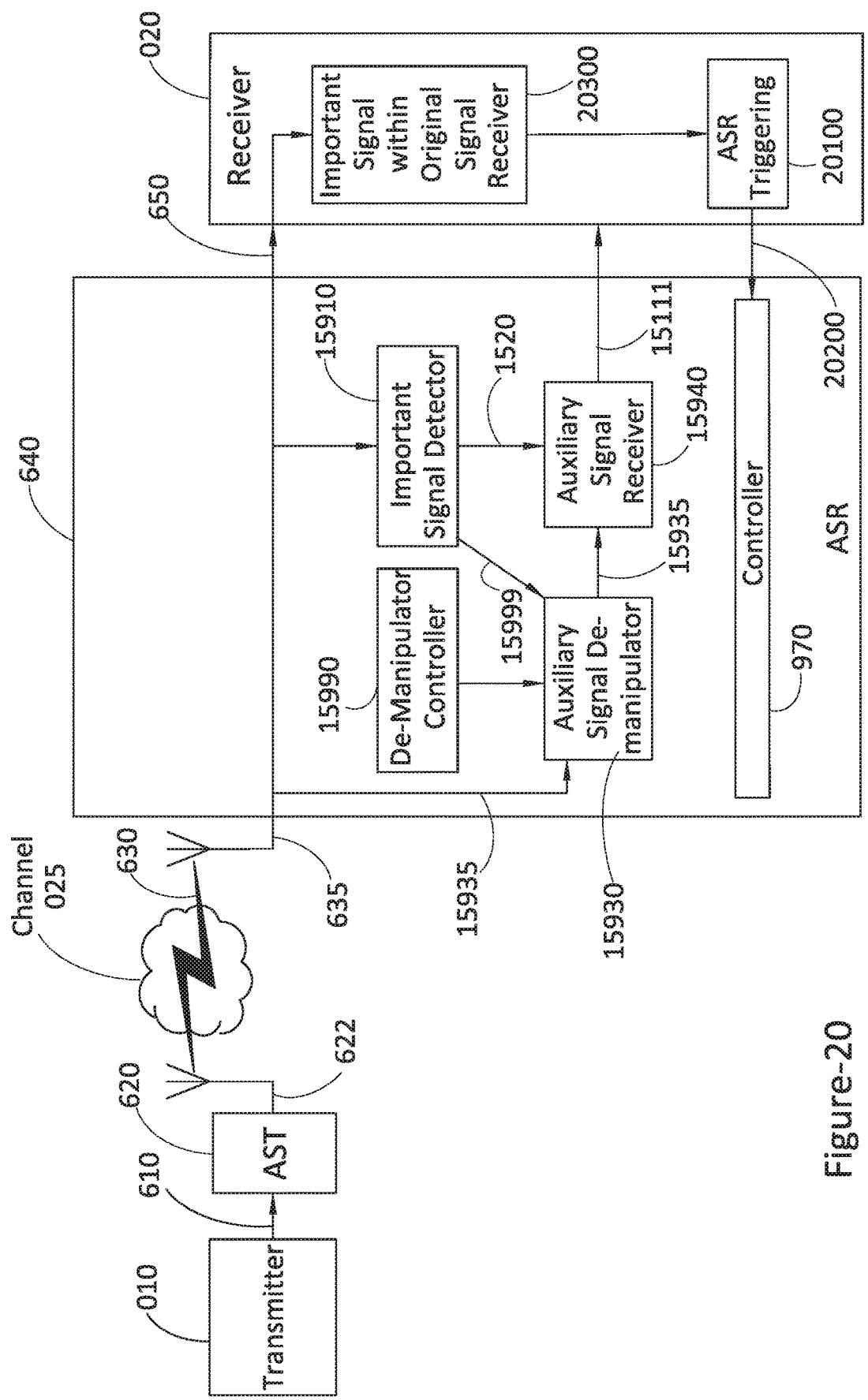
FIGS. 20-21 show embodiments of the present invention which increase power efficiency during usage of the Auxiliary Signal Receiver (ASR).
Figure 21:
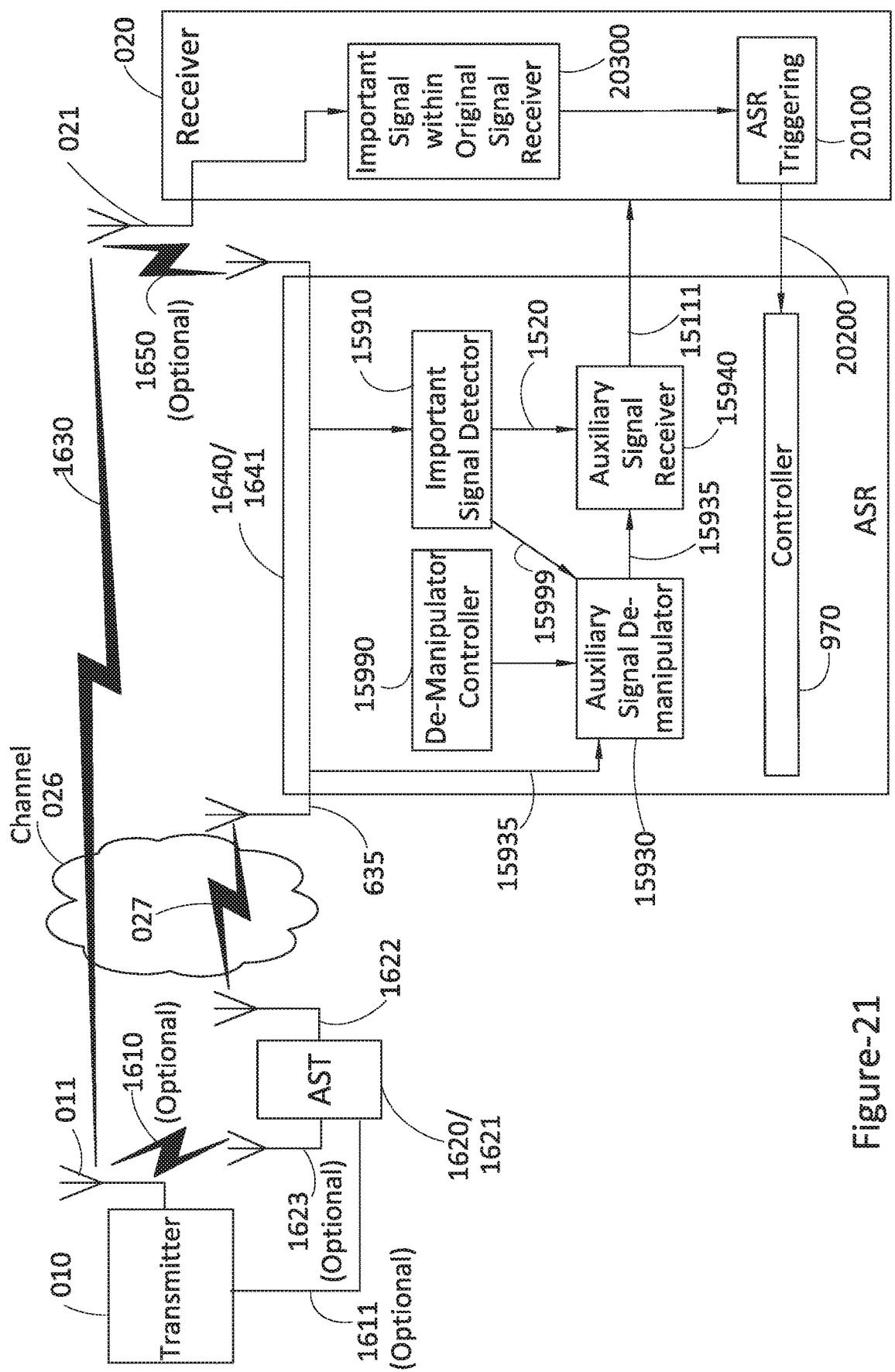

FIGS. 20-21 show other embodiments of present invention. These embodiments increase power efficiency during usage of the ASR. These embodiments described in this paragraph may be applied to the two exampled auxiliary signal apparatus configurations of FIGS. 20 and 21. When there is adequate reception of the important signal by the receiver, some or all of the ASR blocks (such as De-Manipulator 15990, Auxiliary Signal manipulator 15930, Important Signal Detector 15910 and Auxiliary Signal Receiver 15940) may be disabled, turned-off or at standby mode and therefore consume less power than when fully operational. In these figures it can be seen that some additional blocks may be provided within the receiver 020. The first block is the "important signal within original signal receiver" 20300 whose functionality is to extract and receive the important signal from the reception of the original received signal. In case of improper reception at the receiver 020 of the important signal from the original signal, block 20300 informs the ASR triggering block 20100 of such an event, and thereafter the ASR Triggering block 20100 informs/triggers the ASR controller 970 to activate all ASR 1640/1641 blocks to be fully operational and to transfer to the receiver 020 the ASR-received important signal (and/or important signal information).

FIG. 22 is a simplified flowchart illustration of an improved communication method for use cases in which certain portions ("important signal" or "needed signal") of a signal ("original signal") are on the one hand of particular interest in a given situation but on the other hand are not adequately received in that situation. The apparatus of the present invention may be dynamic such that the steps of FIG. 22 may be repeated, each time with different auxiliary signal characteristics, for each of a sequence of different situations. The method of FIG. 22 is also suitable for a posteriori use of a communication protocol in a communication situation which does not fully comply with the communication channel model which explicitly or implicitly underlies the communication protocol. The term "situation" here includes any characteristic of any device or object or event, within the system or external to the system, which causes the communication protocol to work imperfectly for at least certain use cases. For example, the environment or medium may be more urban or suburban or rural than the protocol originally anticipated. And/or the level of interference or noise may be different e.g. higher than the protocol originally anticipated. And/or the type of equipment may be different than the protocol originally anticipated, for example LTE protocol assumes that base stations are static whereas mobile base stations including moving relays may in fact be in use. And/or the type of interference may differ from what the protocol originally anticipated e.g. the interference, in practice, may be of CW type or modulated signal interference or adaptive white Guassian noise interference whereas the protocol did not envisage these types. And/or the range between the transmitting and receiving ends may be different e.g. longer than the protocol originally anticipated e.g. 20 km instead of 10 km, or any other numerical discrepancy which may cause certain portions ("important signal" or "needed signal") of a signal ("original signal") which are of particular interest in a given situation to be less than adequately received in that situation.

The method of FIG. 22 includes some or all of the illustrated self-explanatory steps, suitably ordered e.g. as shown. Each of the steps may be implemented using any of the embodiments shown and described in detail herein with reference to FIGS. 1-21. It is appreciated that more generally, references to the important signal herein may as appropriate be replaced by a representation of characteristics of the important signal other than the signal itself e.g. important signal information as described herein.

According to certain embodiments, channel information passes from the ASR back to the AST and wherein the ASR and AST are respectively close enough to the Rx and Tx such that the Tx-Rx and AST-ASR channels are similar, hence the channel information reaching the AST will also characterize the Rx-Tx channel.

According to certain embodiments, the ASR determines whether to activate and/or to de-activate and/or to put in standby mode one or more of the ASR's internal blocks based at least in part on the reception quality of the important signal at the ASR.

Also included in the present invention are the following embodiments:

Embodiment 47

A wireless communication system comprising:
at least one wireless communication network node having a capacity for communicating with at least one additional wireless communication network node at a given center frequency and according to a given wireless communication protocol; and at least one external frequency converter, external to said node, said converter shifting the received signal of said at least one wireless network node from a first alternative center frequency to said given center frequency, wherein said first alternative center frequency is changed from time to time during communication between said at least one wireless communication network node and said at least one additional wireless communication network node; and wherein said external frequency converter is operative to receive an auxiliary signal at a second alternative center frequency.

Embodiment 50

A system according to Embodiment 47 or any of the preceding embodiments wherein said external frequency converter comprises an auxiliary Signal receiver operative to receive said auxiliary signal.

Embodiment 65

A system according to Embodiment 47 or any of the preceding embodiments wherein said auxiliary signal is received out of the frequency band of the transmission of said communication protocol.

Embodiment 66

A system according to Embodiment 47 or any of the preceding embodiments wherein said auxiliary signal is received within the frequency band of the transmission of said communication protocol.

Embodiment 67

A system according to Embodiment 47 or any of the preceding embodiments wherein said auxiliary signal is received continuously whenever said communication protocol is received.

Embodiment 68

A system according to Embodiment 47 or any of the preceding embodiments wherein said auxiliary signal is received only during partial intervals of the transmission of said communication protocol.

Embodiment 69

A system according to Embodiment 47 or any of the preceding embodiments wherein said auxiliary signal spans over the whole frequency bandwidth as the transmission of said communication protocol.

Embodiment 70

A system according to Embodiment 47 or any of the preceding embodiments wherein said auxiliary signal spans over only partial frequency bandwidth as the transmission of said communication protocol.

Embodiment 71

A system according to Embodiment 47 or any of the preceding embodiments wherein said auxiliary signal is a CW signal.

Embodiment 72

A system according to Embodiment 47 or any of the preceding embodiments wherein said auxiliary signal is a predetermined signal.

Embodiment 73

A system according to Embodiment 47 or any of the preceding embodiments wherein said auxiliary signal is a single frequency tone.

Embodiment 74

A system according to Embodiment 47 or any of the preceding embodiments wherein said auxiliary signal comprises multiple frequency tones.

Embodiment 75

A system according to Embodiment 47 or any of the preceding embodiments wherein said auxiliary signal is received periodically.

Embodiment 76

A system according to Embodiment 47 or any of the preceding embodiments wherein said auxiliary signal is carrying information.

Embodiment 77

A system according to Embodiment 47 or any of the preceding embodiments wherein said auxiliary signal is a modulated signal carrying information.

Embodiment 78

A system according to Embodiment 47 or any of the preceding embodiments wherein said second alternative center frequency is changed from time to time during communication between said at least one wireless communication network node and said at least one additional wireless communication network node.

Embodiment 79

A system according to Embodiment 76 or any of the preceding embodiments wherein said information comprises said first alternative center frequency.

Embodiment 80

A system according to Embodiment 76 or any of the preceding embodiments wherein said information comprises the first alternative center frequency for the next change. Typically, the Auxiliary Signal carries information of the frequency to be used when the upcoming frequency change occurs.

Embodiment 81

A system according to Embodiment 76 or any of the preceding embodiments wherein said information comprises the second alternative center frequency for the next change.

Embodiment 82

A system according to Embodiment 78 or any of the preceding embodiments wherein said first and second alternative center frequencies is changed periodically every predetermined time interval.

Embodiment 83

A system according to Embodiment 78 or any of the preceding embodiments wherein said first and second alternative center frequencies are taken from a predetermined list of frequencies.

Embodiment 84

A system according to Embodiment 78 or any of the preceding embodiments wherein said first and second alternative center frequencies are computed by the external frequency converter.

Embodiment 85

A system according to Embodiment 78 or any of the preceding embodiments wherein said first and second alternative center frequencies are configured by means external to said external frequency converter.

Embodiment 86

A system according to Embodiment 78 or any of the preceding embodiments wherein said external frequency converter comprises a Important Signal Detector, operative to detect predetermined portion of the signal of said communication protocol, and to synchronize said change in said first and second alternative center frequencies during said detected portion of the signal.

Embodiment 87

A system according to Embodiment 47 or any of the preceding embodiments wherein said communication protocol comprises an LTE cellular communication protocol.

Embodiment 88

A system according to Embodiment 47 or any of the preceding embodiments wherein said communication protocol comprises a 3G cellular communication protocol.

Embodiment 89

A system according to Embodiment 47 or any of the preceding embodiments wherein said communication protocol comprises a WiMAX cellular communication protocol.

Embodiment 90

A system according to Embodiment 47 or any of the preceding embodiments wherein said communication protocol comprises an OFDM communication protocol.

Embodiment 91

A system according to Embodiment 47 or any of the preceding embodiments wherein said communication protocol comprises an OFDMA communication protocol.

Embodiment 92

A system according to Embodiment 86 or any of the preceding embodiments and also to Embodiment 90, wherein said predetermined portion is a Cyclic Prefix of an OFDM symbol.

Embodiment 93

A system according to Embodiment 86 or any of the preceding embodiments and also to Embodiment 91, wherein said predetermined portion is a Cyclic Prefix of an OFDMA symbol.

Embodiment 94

A system according to Embodiment 86, or any of the preceding embodiments wherein said predetermined portion is a GAP between successive frames of said communication protocol.

Embodiment 95

A system according to Embodiment 86, or any of the preceding embodiments wherein said communication protocol is a TDD protocol, and wherein said predetermined portion is a GAP between the uplink subframe and the downlink subframe of said communication protocol.

Embodiment 96

A system according to Embodiment 50 or any of the preceding embodiments wherein said Auxiliary Signal receiver uses said auxiliary signal to synchronize the external frequency converter to said first alternative center frequency.

Embodiment 97

A system according to Embodiment 50 or any of the preceding embodiments wherein said Auxiliary Signal receiver uses said auxiliary signal to configure the external frequency converter to said first alternative center frequency.

Embodiment 98

A system according to Embodiment 50 or any of the preceding embodiments wherein said Auxiliary Signal receiver uses said auxiliary signal for timing synchronization of the external frequency converter with regard to said communication protocol.

Embodiment 99

A system according to Embodiment 50 and also to Embodiment 76, or any of the preceding embodiments wherein said Auxiliary Signal receiver extracts said information from said auxiliary signal.

Embodiment 100

A system according to Embodiment 99 or any of the preceding embodiments wherein said extracted information is used to configure the external frequency converter to said first alternative center frequency.

Embodiment 101

A system according to Embodiment 50 or any of the preceding embodiments and also to Embodiment 79, wherein said Auxiliary Signal receiver extracts said information from said auxiliary signal, and wherein said extracted information is used to configure the external frequency converter to said first alternative center frequency.

Embodiment 102

A system according to Embodiment 50 or any of the preceding embodiments and also to Embodiment 80, wherein said Auxiliary Signal receiver extracts said information from said auxiliary signal, and wherein said extracted information is used to configure the external frequency converter to said first alternative center frequency for the upcoming (e.g. next) change.

Embodiment 103

A system according to Embodiment 50 and also to Embodiment 81, or any of the preceding embodiments wherein said Auxiliary Signal (AS) receiver extracts said information from said auxiliary signal, and wherein said extracted information is used to configure the external frequency converter to said second alternative center frequency for the upcoming (e.g. next) change.

It is appreciated that a single node may include transmitter, receiver, ASR, AST or any sub-combination thereof.

It is appreciated that terminology such as "mandatory", "required", "need" and "must" refer to implementation choices made within the context of a particular implementation or application described therewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution may include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet. Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. An improved mobile and/or cellular and/or wireless communication method for transmitting an original signal, the method comprising:
   using an auxiliary signal generator for generating an auxiliary signal operative to improve reception of portions of the original signal; and
   transmitting at least the auxiliary signal to the receiving end,
   wherein at the receiving end, information characterizing said portions of the original signal as received, is replaced or enhanced or augmented by the auxiliary signal,
   thereby improving communication at least for use-cases in which portions ("important signal" or "needed signal") of the original signal are on the one hand of particular interest in a given situation, but on the other hand are not adequately received in that situation, and
   wherein the important signal is a logical portion of the original signal whose location within the original signal, given the protocol being used to transmit the original signal from transmitters to receivers, is known.

2. A method according to claim 1, wherein the generating and transmitting are performed a plurality of times for a plurality of given situations respectively.

3. A method according to claim 1, wherein the generating and transmitting are performed using a protocol whose operation was designed assuming a different situation such that the protocol is imperfect in the given situation.

4. A method according to claim 1, wherein the auxiliary signal is generated from the original signal and/or from the important signal and is transmitted in addition thereto.

5. A method according to claim 4, wherein the auxiliary signal is generated from the original signal and/or from the important signal and is transmitted simultaneously therewith.

6. A method according to claim 1,
   wherein the auxiliary signal is generated and transmitted by an AST, and
   wherein AS-Tx (transmitter to AST) communication is good enough to ensure that the important signal is received accurately by the AST or at least is received well enough to enable the AST to fix the important signal before sending it to the ASR.

7. A method according to claim 1,
   wherein the auxiliary signal is received by an ASR, and
   wherein the ASR-Rx (ASR to receiver) communication is good enough to ensure that the important signal can be transmitted adequately from the ASR to the Rx.

8. A method according to claim 1, wherein the auxiliary signal is generated from the original signal and/or from the important signal by suitably augmenting or modifying or strengthening the "important signal" within the original signal.

9. A method according to claim 1, wherein the important signal, at least, may pass from the original signal's Tx to the AST wirelessly.

10. A method according to claim 1, wherein the Tx and AST are co-located.

11. A method according to claim 6, wherein the AST includes a needed (e.g. important) signal detector which is pre-programmed to identify the needed signal within the original signal.

12. A method according to claim 1, wherein the AST includes a needed signal detector which is programmed to receive dynamic information identifying needed components for a given dynamic use-case and/or communication situation and to use said dynamic information to identify the needed signal within the original signal.

13. A method according to claim 1, wherein the AST includes an auxiliary signal generating functionality operative to receive the needed signal from the detector and to determine that the needed signal requires adaption if the needed signal is to be adequately received by the Rx; the auxiliary signal generating functionality then generates an auxiliary signal which will ensure this.

14. A method according to claim 13, wherein the auxiliary signal generating functionality ensures this using more power to transmit the needed signal.

15. A method according to claim 13, wherein the auxiliary signal generating functionality comprises an auxiliary signal generator operative to generates the auxiliary signal's baseband.

16. A method according to claim 13, wherein the auxiliary signal generating functionality comprises an auxiliary signal manipulator which performs manipulation on at least the baseband at the output of the auxiliary signal generating functionality.

17. A method according to claim 16, wherein said manipulation includes at least one of:
up frequency conversion,
down frequency conversion,
frequency hopping, and
increasing the power at which the auxiliary signal is transmitted.

18. A method according to claim 1, wherein the auxiliary signal generator provide added robustness to the auxiliary signal's baseband relative to the original signal by performing at least one of:
using better error correction code relative to the original signal e.g. error correction code which is better, in the given communication situation, than the error correction code mandated by a protocol used to transmit the original signal,
decreasing or otherwise modifying modulation of original signal,
changing the OFDM or PFK or FSK;
using adequate antenna configuration or multi antenna scheme e.g. configuration or scheme adequate for the given situation e.g. as opposed to the configuration or scheme mandated by a protocol used to transmit the original signal.

19. A method according to claim 15,
wherein the auxiliary signal generator knows that the auxiliary signal needs to be received in an inferior situation which is noisier (lower SNR) and/or suffers from more interference and/or from lower SINR than the original signal was planned to be received in, and wherein the auxiliary signal generator selects at least one characteristic for the auxiliary signal which is suitable for the specific level of SNR or/and SINR and/or interference characterizing the inferior situation.

20. A method according to claim 19, wherein the level of SNR or/and SINR is known in advance.

21. A method according to claim 19, wherein the level of SNR or/and SINR is received from an external source.

22. A method according to claim 19, wherein the level of SNR or/and SINR is received dynamically from the Rx end.

23. A method according to claim 19, wherein the level of SNR or/and SINR is derived from information received dynamically from the Rx end.

24. A method according to claim 1, wherein the receiving end comprises apparatus for diagnosing quality of reception of the received important signal and how the quality, if low, may be remedied.

25. A method according to claim 1,
wherein channel information passes from the ASR back to the AST, and
wherein the ASR and AST are respectively close enough to the Rx and Tx such that the Tx-Rx and AST-ASR channels are similar, hence the channel information reaching the AST will also characterize the Rx-Tx channel.

26. A method according to claim 6, wherein the AST transmits the auxiliary signal continuously.

27. A method according to claim 7, wherein the ASR only receives when in an active state.

28. A method according to claim 27, wherein said active state is triggered by the receiver if reception of the original signal as a whole or only of the important signal, if known to the receiver, is deemed inadequate.

29. A method according to claim 27, wherein the receiver is battery-powered.

30. A method according to claim 24, wherein the ASR determines whether to activate and/or to de-activate and/or to put in standby mode one or more of the ASR's internal blocks based at least in part on the reception quality of the important signal at the ASR.

31. A method according to claim 2, wherein at least one characteristic of the auxiliary signal changes each time the generating and transmitting are performed, as a function of the plurality of given situations respectively, thereby to bridge between imperfect abilities of the transmitters which may differ over the plurality of situations, and specific needs of the receivers which may differ over the plurality of situations.

32. A method according to claim 1, wherein the auxiliary signal generator is operative to provide added robustness to the auxiliary signal's baseband relative to the original signal including at least one of: using stronger error correction code relative to the original signal, modifying modulation code relative to the original signal, changing at least one of the OFDM or PSK or FSK relative to the original signal, thereby allowing the auxiliary signal to be received even in said given situation.

33. A method according to claim 1, wherein the auxiliary signal generator is operative for spreading of the auxiliary signal's baseband, thereby to provide added robustness only to the auxiliary signal's baseband relative to the original signal allowing the auxiliary signal to be received even in said given situation.

34. An improved mobile and/or cellular and/or wireless communication system for transmitting an original signal, the system comprising:

an apparatus for using an auxiliary signal generator for generating an auxiliary signal operative to improve reception of portions of the original signal; and an apparatus for transmitting at least the auxiliary signal to the receiving end, wherein at the receiving end, information characterizing said portions of the original signal as received, is replaced or enhanced or augmented by the auxiliary signal, thereby improving communication at least for use-cases in which portions ("important signal" or "needed signal") of the original signal are on the one hand of particular interest in a given situation, but on the other hand are not adequately received in that situation, and wherein the important signal is a logical portion of the original signal whose location within the original signal, given the protocol being used to transmit the original signal from transmitters to receivers, is known.

35. A computer program product, comprising a non-transitory computer usable medium having a computer readable program code embodied therein, said computer readable program code adapted to be executed to implement an improved mobile and/or cellular and/or wireless communication method for transmitting an original signal, the method comprising:

using an auxiliary signal generator for generating an auxiliary signal operative to improve reception of portions of the original signal; and transmitting at least the auxiliary signal to the receiving end, wherein at the receiving end, information characterizing said portions of the original signal as received, is replaced or enhanced or augmented by the auxiliary signal, thereby improving communication at least for use-cases in which portions ("important signal" or "needed signal") of the "original signal" are on the one hand of particular interest in a given situation, but on the other hand are not adequately received in that situation, and wherein the important signal is a logical portion of the original signal whose location within the original signal, given the protocol being used to transmit the original signal from transmitters to receivers, is known.

36. A method according to claim 13, wherein the auxiliary signal generating functionality comprises an auxiliary signal manipulator which performs manipulation on at least the intermediate frequency (IF) at the output of the auxiliary signal generating functionality.

37. A method according to claim 13, wherein the auxiliary signal generating functionality comprises an auxiliary signal manipulator which performs manipulation on at least the radio frequency (RF) at the output of the auxiliary signal generating functionality.

* * * * *